(12) United States Patent
Knazik et al.

(10) Patent No.: US 8,064,464 B2
(45) Date of Patent: Nov. 22, 2011

(54) METHOD AND SYSTEM FOR INBOUND CONTENT-BASED QOS

(75) Inventors: Robert J. Knazik, Cocoa Beach, FL (US); Donald L. Smith, Satellite Beach, FL (US); Anthony P. Galluscio, Indialantic, FL (US)

(73) Assignee: Harris Corporation, Melbourne, FL (US)

( * ) Notice: Subject to any disclaimer, the term of this patent is extended or adjusted under 35 U.S.C. 154(b) by 874 days.

(21) Appl. No.: 11/454,219

(22) Filed: Jun. 16, 2006

(65) Prior Publication Data

US 2007/0291766 A1    Dec. 20, 2007

(51) Int. Cl.
*H04L 12/28* (2006.01)
*H04L 12/56* (2006.01)

(52) U.S. Cl. ............... 370/395.42; 370/395.21; 370/412

(58) Field of Classification Search .................. 370/230, 370/231, 395.21, 447, 365; 709/238–240
See application file for complete search history.

(56) References Cited

U.S. PATENT DOCUMENTS

| | | |
|---|---|---|
| 5,241,632 A | 8/1993 | O'Connell et al. |
| 5,559,999 A | 9/1996 | Maturi et al. |
| 5,560,038 A | 9/1996 | Haddock |
| 5,627,970 A | 5/1997 | Keshav |
| 5,664,091 A | 9/1997 | Keen |
| 5,671,224 A | 9/1997 | Pyhalammi et al. |
| 5,748,739 A | 5/1998 | Press |
| 5,761,445 A | 6/1998 | Nguyen |
| 5,784,566 A | 7/1998 | Viavant et al. |
| 5,844,600 A | 12/1998 | Kerr |
| 5,949,758 A | 9/1999 | Kober |
| 5,960,035 A | 9/1999 | Sridhar et al. |
| 6,028,843 A | 2/2000 | Delp et al. |
| 6,044,419 A | 3/2000 | Hayek et al. |
| 6,067,557 A | 5/2000 | Hegde |

(Continued)

FOREIGN PATENT DOCUMENTS

EP    0853404    7/1998

(Continued)

OTHER PUBLICATIONS

Bakre A. V. et al: "Implementation and Performance Evaluation of Indirect TCP" IEEE Transactions on Computers, vol. 46, No. 3, Mar. 1997.

(Continued)

*Primary Examiner* — Chuong T Ho
(74) *Attorney, Agent, or Firm* — McAndrews, Held & Malloy, Ltd.

(57) ABSTRACT

Certain embodiments of the present invention provide a method for communicating inbound network data to provide QoS. The method includes receiving data over a network at a node, prioritizing the data at the node by assigning a priority to the data, and communicating the data to an application at the node based at least in part on the priority of the data. The data priority is based at least in part on message content. Certain embodiments of the present invention provide a system for communicating inbound networking data to provide QoS. The system includes a data prioritization component adapted to prioritize data by assigning a priority to the data and a data communications component adapted to receive the data over a network and to communicate the data to an application based at least in part on the priority of the data. The data priority is based at least in part on message content.

16 Claims, 5 Drawing Sheets

U.S. PATENT DOCUMENTS

| | | | |
|---|---|---|---|
| 6,072,781 A | 6/2000 | Feeney et al. |
| 6,075,770 A | 6/2000 | Chang et al. |
| 6,115,378 A | 9/2000 | Hendel et al. |
| 6,124,806 A | 9/2000 | Cunningham et al. |
| 6,154,778 A | 11/2000 | Koistinen et al. |
| 6,170,075 B1 | 1/2001 | Schuster et al. |
| 6,185,520 B1 | 2/2001 | Brown et al. |
| 6,205,486 B1 | 3/2001 | Wei et al. |
| 6,233,248 B1 | 5/2001 | Sautter et al. |
| 6,236,656 B1 | 5/2001 | Westerberg et al. |
| 6,247,058 B1 | 6/2001 | Miller et al. |
| 6,279,035 B1 | 8/2001 | Brown et al. |
| 6,301,527 B1 | 10/2001 | Butland et al. |
| 6,314,425 B1 | 11/2001 | Serbinis et al. |
| 6,332,163 B1 | 12/2001 | Bowman-Amuah |
| 6,343,085 B1 | 1/2002 | Krishnan et al. |
| 6,343,318 B1 | 1/2002 | Hawkins et al. |
| 6,363,411 B1 | 3/2002 | Dugan et al. |
| 6,397,259 B1 | 5/2002 | Lincke et al. |
| 6,401,117 B1 | 6/2002 | Narad et al. |
| 6,404,776 B1 | 6/2002 | Voois et al. |
| 6,407,998 B1 * | 6/2002 | Polit et al. ............. 370/365 |
| 6,408,341 B1 | 6/2002 | Feeney et al. |
| 6,421,335 B1 | 7/2002 | Kilkki et al. |
| 6,438,603 B1 | 8/2002 | Ogus |
| 6,446,204 B1 | 9/2002 | Pang et al. |
| 6,449,251 B1 | 9/2002 | Awadallah et al. |
| 6,490,249 B1 | 12/2002 | Aboul-Magd et al. |
| 6,498,782 B1 | 12/2002 | Branstad et al. |
| 6,507,864 B1 | 1/2003 | Klein et al. |
| 6,532,465 B2 | 3/2003 | Hartley et al. |
| 6,542,593 B1 | 4/2003 | Bowman-Amuah |
| 6,556,982 B1 | 4/2003 | McGaffey et al. |
| 6,557,053 B1 | 4/2003 | Bass et al. |
| 6,560,592 B1 | 5/2003 | Reid et al. |
| 6,563,517 B1 | 5/2003 | Bhagwat et al. |
| 6,587,435 B1 | 7/2003 | Miyake et al. |
| 6,587,875 B1 | 7/2003 | Ogus |
| 6,590,588 B2 | 7/2003 | Lincke et al. |
| 6,598,034 B1 | 7/2003 | Kloth |
| 6,600,744 B1 | 7/2003 | Carr et al. |
| 6,611,522 B1 | 8/2003 | Zheng et al. |
| 6,614,781 B1 | 9/2003 | Elliott et al. |
| 6,618,385 B1 | 9/2003 | Cousins |
| 6,625,133 B1 | 9/2003 | Balachandran et al. |
| 6,625,650 B2 | 9/2003 | Stelliga |
| 6,633,835 B1 | 10/2003 | Moran et al. |
| 6,640,184 B1 | 10/2003 | Rabe |
| 6,640,248 B1 | 10/2003 | Jorgensen |
| 6,650,902 B1 | 11/2003 | Richton |
| 6,668,175 B1 | 12/2003 | Almgren et al. |
| 6,671,589 B2 | 12/2003 | Holst et al. |
| 6,671,732 B1 | 12/2003 | Weiner |
| 6,680,922 B1 | 1/2004 | Jorgensen |
| 6,687,735 B1 | 2/2004 | Logston et al. |
| 6,691,168 B1 | 2/2004 | Bal et al. |
| 6,700,871 B1 | 3/2004 | Harper et al. |
| 6,715,145 B1 | 3/2004 | Bowman-Amuah |
| 6,728,749 B1 | 4/2004 | Richardson |
| 6,732,185 B1 | 5/2004 | Reistad |
| 6,732,228 B1 | 5/2004 | Willardson |
| 6,741,562 B1 | 5/2004 | Keirouz et al. |
| 6,748,070 B2 | 6/2004 | Kalmanek, Jr. et al. |
| 6,760,309 B1 | 7/2004 | Rochberger et al. |
| 6,771,609 B1 | 8/2004 | Gudat et al. |
| 6,772,223 B1 | 8/2004 | Corl et al. |
| 6,778,530 B1 | 8/2004 | Greene |
| 6,778,546 B1 | 8/2004 | Epps et al. |
| 6,798,776 B1 | 9/2004 | Cheriton et al. |
| 6,816,903 B1 | 11/2004 | Rakoshitz et al. |
| 6,819,655 B1 | 11/2004 | Gregson |
| 6,819,681 B1 | 11/2004 | Hariharasubrahmanian |
| 6,820,117 B1 | 11/2004 | Johnson |
| 6,822,940 B1 | 11/2004 | Zavalkovsky et al. |
| 6,826,627 B2 | 11/2004 | Sjollema et al. |
| 6,832,118 B1 | 12/2004 | Heberlein et al. |
| 6,832,239 B1 | 12/2004 | Kraft et al. |
| 6,839,731 B2 | 1/2005 | Alexander et al. |
| 6,839,768 B2 | 1/2005 | Ma et al. |
| 6,845,100 B1 | 1/2005 | Rinne |
| 6,850,486 B2 | 2/2005 | Saleh et al. |
| 6,854,009 B1 | 2/2005 | Hughes |
| 6,854,069 B2 | 2/2005 | Kampe et al. |
| 6,862,265 B1 | 3/2005 | Appala et al. |
| 6,862,622 B2 | 3/2005 | Jorgensen |
| 6,865,153 B1 | 3/2005 | Hiel et al. |
| 6,870,812 B1 | 3/2005 | Kloth et al. |
| 6,873,600 B1 | 3/2005 | Duffield et al. |
| 6,879,590 B2 | 4/2005 | Pedersen et al. |
| 6,882,642 B1 | 4/2005 | Kejriwal et al. |
| 6,885,643 B1 | 4/2005 | Teramoto et al. |
| 6,888,806 B1 | 5/2005 | Miller et al. |
| 6,888,807 B2 | 5/2005 | Heller et al. |
| 6,891,839 B2 | 5/2005 | Albert et al. |
| 6,891,842 B2 | 5/2005 | Sahaya et al. |
| 6,891,854 B2 | 5/2005 | Zhang et al. |
| 6,892,309 B2 | 5/2005 | Richmond et al. |
| 6,901,484 B2 | 5/2005 | Doyle et al. |
| 6,904,054 B1 | 6/2005 | Baum et al. |
| 6,904,058 B2 | 6/2005 | He et al. |
| 6,907,243 B1 | 6/2005 | Patel |
| 6,907,258 B2 | 6/2005 | Tsutsumi et al. |
| 6,907,462 B1 | 6/2005 | Li et al. |
| 6,910,074 B1 | 6/2005 | Amin et al. |
| 6,912,221 B1 | 6/2005 | Zadikian et al. |
| 6,914,882 B2 | 7/2005 | Merani et al. |
| 6,917,622 B2 | 7/2005 | McKinnon, III et al. |
| 6,920,145 B2 | 7/2005 | Matsuoka et al. |
| 6,922,724 B1 | 7/2005 | Freeman et al. |
| 6,928,085 B2 | 8/2005 | Haartsen |
| 6,928,471 B2 | 8/2005 | Pabari et al. |
| 6,934,250 B1 | 8/2005 | Kejriwal et al. |
| 6,934,752 B1 | 8/2005 | Gubbi |
| 6,934,795 B2 | 8/2005 | Nataraj et al. |
| 6,937,154 B2 | 8/2005 | Zeps et al. |
| 6,937,561 B2 | 8/2005 | Chiussi et al. |
| 6,937,566 B1 | 8/2005 | Forslow |
| 6,937,591 B2 | 8/2005 | Guo et al. |
| 6,937,600 B2 | 8/2005 | Takagi |
| 6,940,808 B1 | 9/2005 | Shields et al. |
| 6,940,813 B2 * | 9/2005 | Ruutu ............. 370/231 |
| 6,940,832 B2 | 9/2005 | Saadawi et al. |
| 6,941,341 B2 | 9/2005 | Logston et al. |
| 6,944,168 B2 | 9/2005 | Paatela et al. |
| 6,947,378 B2 | 9/2005 | Wu et al. |
| 6,947,943 B2 | 9/2005 | DeAnna et al. |
| 6,947,996 B2 | 9/2005 | Assa et al. |
| 6,950,400 B1 | 9/2005 | Tran et al. |
| 6,950,441 B1 | 9/2005 | Kaczmarczyk et al. |
| 6,952,401 B1 | 10/2005 | Kadambi et al. |
| 6,952,416 B1 | 10/2005 | Christie, IV |
| 6,975,638 B1 | 12/2005 | Chen et al. |
| 6,975,647 B2 | 12/2005 | Neale et al. |
| 7,023,851 B2 | 4/2006 | Chakravorty |
| 7,065,084 B2 | 6/2006 | Seo |
| 7,068,599 B1 | 6/2006 | Jiang et al. |
| 7,076,552 B2 | 7/2006 | Mandato |
| 7,095,715 B2 | 8/2006 | Buckman et al. |
| 7,149,898 B2 | 12/2006 | Marejka et al. |
| 7,200,144 B2 | 4/2007 | Terrell et al. |
| 7,251,242 B2 | 7/2007 | Schrodi |
| 7,260,102 B2 | 8/2007 | Mehrvar et al. |
| 7,289,498 B2 | 10/2007 | Yu et al. |
| 7,330,908 B2 | 2/2008 | Jungck |
| 7,337,236 B2 * | 2/2008 | Bess et al. ............. 709/240 |
| 7,349,422 B2 * | 3/2008 | Duong et al. ............. 370/447 |
| 7,359,321 B1 | 4/2008 | Sindhu et al. |
| 7,376,829 B2 | 5/2008 | Ranjan |
| 7,392,323 B2 | 6/2008 | Yim et al. |
| 7,408,932 B2 | 8/2008 | Kounavis et al. |
| 7,424,579 B2 | 9/2008 | Wheeler et al. |
| 7,433,307 B2 | 10/2008 | Hooper et al. |
| 7,434,221 B2 | 10/2008 | Hooper et al. |
| 7,437,478 B2 | 10/2008 | Yokota et al. |
| 7,471,689 B1 | 12/2008 | Tripathi et al. |
| 7,477,651 B2 | 1/2009 | Schmidt et al. |
| 7,489,666 B2 | 2/2009 | Koo et al. |

| | | |
|---|---|---|
| 7,499,457 B1 | 3/2009 | Droux et al. |
| 7,539,175 B2 | 5/2009 | White et al. |
| 7,543,072 B1 | 6/2009 | Hertzog et al. |
| 7,590,756 B2 | 9/2009 | Chan |
| 7,720,047 B1 | 5/2010 | Katz et al. |
| 7,756,134 B2 * | 7/2010 | Smith et al. .................. 370/394 |
| 7,813,359 B1 | 10/2010 | Yamawaki |
| 7,869,428 B2 | 1/2011 | Shake et al. |
| 7,894,509 B2 * | 2/2011 | Smith et al. .................. 375/152 |
| 7,916,626 B2 * | 3/2011 | Smith et al. .................. 370/216 |
| 2001/0030970 A1 | 10/2001 | Wiryaman et al. |
| 2002/0009060 A1 | 1/2002 | Gross |
| 2002/0009081 A1 | 1/2002 | Sampath et al. |
| 2002/0010792 A1 | 1/2002 | Border |
| 2002/0062395 A1 * | 5/2002 | Thompson et al. ........... 709/246 |
| 2002/0064128 A1 | 5/2002 | Hughes et al. |
| 2002/0091802 A1 | 7/2002 | Paul et al. |
| 2002/0122387 A1 | 9/2002 | Ni |
| 2002/0122395 A1 | 9/2002 | Bourlas et al. |
| 2002/0141338 A1 | 10/2002 | Burke |
| 2002/0143948 A1 | 10/2002 | Maher |
| 2002/0160805 A1 | 10/2002 | Laitinen et al. |
| 2002/0188871 A1 | 12/2002 | Noehring et al. |
| 2002/0191253 A1 | 12/2002 | Yang et al. |
| 2003/0004952 A1 | 1/2003 | Nixon et al. |
| 2003/0016625 A1 | 1/2003 | Narsinh et al. |
| 2003/0021291 A1 | 1/2003 | White et al. |
| 2003/0033394 A1 | 2/2003 | Stine |
| 2003/0067877 A1 | 4/2003 | Sivakumar et al. |
| 2003/0110286 A1 | 6/2003 | Antal et al. |
| 2003/0112802 A1 | 6/2003 | Ono et al. |
| 2003/0112822 A1 | 6/2003 | Hong et al. |
| 2003/0112824 A1 * | 6/2003 | Acosta ........................ 370/474 |
| 2003/0118107 A1 | 6/2003 | Itakura et al. |
| 2003/0158963 A1 * | 8/2003 | Sturdy et al. .................. 709/238 |
| 2003/0163539 A1 | 8/2003 | Piccinelli |
| 2003/0186724 A1 | 10/2003 | Tsutsumi et al. |
| 2003/0189935 A1 | 10/2003 | Warden et al. |
| 2003/0195983 A1 | 10/2003 | Krause |
| 2003/0236828 A1 | 12/2003 | Rock et al. |
| 2004/0001493 A1 | 1/2004 | Cloonan et al. |
| 2004/0038685 A1 | 2/2004 | Nakabayashi |
| 2004/0057437 A1 | 3/2004 | Daniel et al. |
| 2004/0076161 A1 | 4/2004 | Lavian et al. |
| 2004/0077345 A1 | 4/2004 | Turner et al. |
| 2004/0105452 A1 | 6/2004 | Koshino et al. |
| 2004/0125815 A1 | 7/2004 | Shimazu et al. |
| 2004/0131014 A1 * | 7/2004 | Thompson et al. ........... 370/230 |
| 2004/0151114 A1 * | 8/2004 | Ruutu ........................... 370/230 |
| 2004/0165528 A1 | 8/2004 | Li et al. |
| 2004/0172476 A1 | 9/2004 | Chapweske |
| 2004/0174898 A1 | 9/2004 | Kadambi et al. |
| 2004/0190451 A1 | 9/2004 | Dacosta |
| 2004/0218532 A1 | 11/2004 | Khirman |
| 2004/0228363 A1 | 11/2004 | Adamczyk et al. |
| 2004/0252698 A1 | 12/2004 | Anschutz et al. |
| 2005/0021806 A1 | 1/2005 | Richardson et al. |
| 2005/0030952 A1 | 2/2005 | Elmasry |
| 2005/0041669 A1 | 2/2005 | Cansever et al. |
| 2005/0060427 A1 | 3/2005 | Phillips et al. |
| 2005/0078672 A1 | 4/2005 | Caliskan et al. |
| 2005/0114036 A1 | 5/2005 | Fruhling et al. |
| 2005/0157660 A1 | 7/2005 | Mandato et al. |
| 2005/0169257 A1 | 8/2005 | Lahetkangas et al. |
| 2005/0171932 A1 | 8/2005 | Nandhra |
| 2005/0220115 A1 | 10/2005 | Romano et al. |
| 2005/0226233 A1 | 10/2005 | Kryuchkov et al. |
| 2005/0232153 A1 | 10/2005 | Bishop et al. |
| 2005/0281277 A1 | 12/2005 | Killian |
| 2006/0036906 A1 | 2/2006 | Luciani et al. |
| 2006/0039381 A1 | 2/2006 | Anschutz et al. |
| 2006/0039404 A1 * | 2/2006 | Rao et al. ..................... 370/465 |
| 2006/0083261 A1 | 4/2006 | Maeda et al. |
| 2006/0104287 A1 | 5/2006 | Rogasch et al. |
| 2006/0106753 A1 | 5/2006 | Yoon et al. |
| 2006/0109857 A1 | 5/2006 | Herrmann |
| 2006/0140121 A1 | 6/2006 | Kakani et al. |
| 2006/0149845 A1 | 7/2006 | Malin et al. |
| 2006/0165051 A1 | 7/2006 | Banerjee et al. |
| 2006/0215593 A1 | 9/2006 | Wang et al. |
| 2006/0286993 A1 | 12/2006 | Xie et al. |
| 2007/0008883 A1 | 1/2007 | Kobayashi |
| 2007/0058561 A1 | 3/2007 | Virgile |
| 2007/0060045 A1 | 3/2007 | Prautzsch |
| 2007/0070895 A1 | 3/2007 | Narvaez |
| 2007/0133582 A1 | 6/2007 | Banerjee et al. |
| 2007/0153798 A1 | 7/2007 | Krstulich |
| 2007/0156919 A1 * | 7/2007 | Potti et al. ..................... 709/238 |
| 2007/0171910 A1 | 7/2007 | Kumar |
| 2007/0189327 A1 | 8/2007 | Konda |
| 2007/0206506 A1 | 9/2007 | Purpura |
| 2007/0253412 A1 | 11/2007 | Batteram et al. |
| 2007/0258445 A1 * | 11/2007 | Smith et al. .................. 370/389 |
| 2007/0263616 A1 | 11/2007 | Castro et al. |
| 2007/0275728 A1 * | 11/2007 | Lohr et al. ..................... 455/450 |
| 2007/0291647 A1 * | 12/2007 | Smith et al. .................. 370/237 |
| 2007/0291656 A1 * | 12/2007 | Knazik et al. ................. 370/252 |
| 2007/0291751 A1 | 12/2007 | Smith et al. |
| 2007/0291766 A1 * | 12/2007 | Knazik et al. ............. 370/395.21 |
| 2008/0065808 A1 | 3/2008 | Hoese et al. |
| 2008/0144493 A1 | 6/2008 | Yeh |
| 2008/0293413 A1 | 11/2008 | Sharif-Ahmadi et al. |
| 2009/0161741 A1 | 6/2009 | Ginis et al. |

FOREIGN PATENT DOCUMENTS

| | | |
|---|---|---|
| EP | 0886454 | 12/1998 |
| EP | 1052816 | 11/2000 |
| EP | 1052816 A2 | 11/2000 |
| EP | 1146704 | 10/2001 |
| EP | 1191751 | 3/2002 |
| EP | 1193938 | 3/2002 |
| EP | 1193938 | 4/2002 |
| EP | 1193938 A1 | 4/2002 |
| EP | 1300991 | 4/2003 |
| EP | 1300991 A1 | 4/2003 |
| EP | 1180882 | 10/2004 |
| EP | 1575224 | 2/2005 |
| EP | 1575224 | 9/2005 |
| EP | 1622322 | 1/2006 |
| EP | 1648125 | 4/2006 |
| JP | 3019545 | 1/1991 |
| JP | H07-007516 | 1/1995 |
| JP | H08-307454 | 11/1996 |
| JP | H08-316989 | 11/1996 |
| JP | H08-316990 | 11/1996 |
| JP | H09-149051 | 6/1997 |
| JP | 9191314 | 7/1997 |
| JP | 10051495 | 2/1998 |
| JP | 11122264 | 4/1999 |
| JP | 2000-049866 | 2/2000 |
| JP | 2000-207234 | 7/2000 |
| JP | 2001045056 | 2/2001 |
| JP | 2001-186173 | 7/2001 |
| JP | 2001186173 | 7/2001 |
| JP | 2001-308947 | 11/2001 |
| JP | 2001-522115 | 11/2001 |
| JP | 2002-044136 | 2/2002 |
| JP | 2003-078555 | 3/2003 |
| JP | 2003-209577 | 7/2003 |
| JP | 2003-298593 | 10/2003 |
| JP | 2003298593 | 10/2003 |
| JP | 2004-222010 | 5/2004 |
| JP | 2005-027240 | 1/2005 |
| JP | 2005-217491 | 8/2005 |
| JP | 2005-244269 | 9/2005 |
| JP | 2006-031063 | 2/2006 |
| JP | 2006031063 | 2/2006 |
| JP | 2006-087147 | 3/2006 |
| JP | 2006-121192 | 5/2006 |
| JP | 2006-166426 | 6/2006 |
| KR | 2002-45703 | 6/2002 |
| KR | 2004-71761 | 8/2004 |
| WO | 9824208 | 6/1998 |
| WO | WO99-23786 | 5/1999 |
| WO | WO9922494 | 5/1999 |
| WO | 0008817 | 2/2000 |
| WO | WO0174027 | 10/2001 |
| WO | 0230066 | 4/2002 |

| | | |
|---|---|---|
| WO | WO0230066 A1 | 4/2002 |
| WO | W003053013 | 6/2003 |
| WO | W003/058466 | 7/2003 |
| WO | W02004023323 | 3/2004 |
| WO | W02004036845 | 4/2004 |
| WO | 2005006664 | 1/2005 |
| WO | W02005006664 | 1/2005 |
| WO | W02005076539 | 8/2005 |
| WO | W02006006632 | 1/2006 |
| WO | 2006001155 | 7/2006 |
| WO | W02006071155 | 7/2006 |
| WO | WO2006071155 A1 | 7/2006 |
| WO | 2007149165 | 2/2007 |
| WO | 2007149166 | 2/2007 |
| WO | 2007130414 | 11/2007 |
| WO | 2007130415 | 11/2007 |
| WO | 2007147032 | 12/2007 |
| WO | 2007147040 | 12/2007 |
| WO | 2007149769 | 12/2007 |
| WO | 2007149805 | 12/2007 |
| WO | WO2007147032 A1 | 12/2007 |
| WO | WO2007147040 A2 | 12/2007 |
| WO | WO2007149769 A2 | 12/2007 |
| WO | WO2007149805 A2 | 12/2007 |
| WO | 2008008865 | 1/2008 |
| WO | WO2008008865 A2 | 1/2008 |
| WO | 2008016845 | 2/2008 |
| WO | 2008016846 | 2/2008 |
| WO | 2008016848 | 2/2008 |
| WO | 2008016850 | 2/2008 |
| WO | WO2008016845 A1 | 2/2008 |
| WO | WO2008016846 A2 | 2/2008 |
| WO | WO2008016848 A2 | 2/2008 |
| WO | WO2008016850 A2 | 2/2008 |

OTHER PUBLICATIONS

Chao, H-L, et al.: "Fair Scheduling with QoS Support in Wireless Ad Hoc Networks," IEEE Transactions on Wireless Communications, vol. 3, No. 6, Nov. 2004.

Information Sciences Institute, University of Southern California, "Internet Protocol DARPA Internet Program Protocol Specification," IETF Standard, Internet Engineering Task Force, IETF, CH, Sep. 1981.

Madubata, C.D.: "Prioritization of the Joint Battle Space Infosphere (JBI) Traffic and Priority with Reciprocity CAC Protocol for the JBI Network," System Theory, 2006 Proceeding of the Thirty-Eighth Southeastern Symposium on Mar. 5, 2006.

Orda, A. et al.: "Routing with Packet Duplication and Elimination in Computer Networks," IEEE Transactions on Communications, vol. 36, No. 7, Jul. 1988.

Pancha, P., et al.: "A Delay-Minimizing Service Policy with Guaranteed Bandwidth for Real-Time Traffic," Internet Article, Aug. 23, 1995.

Perkins, Charles E., et al.: "Quality of Service for Ad hoc On-Demand Distance Vector Routing draft-perkins-manet aodvqos-01.txt," IETF Standard-Working-Draft, Internet Engineering Task Force, IETF, Ch. No. 1, Oct. 14, 2003.

Robles, Tomas, et al.: "QoS Support for an All-IP System Beyond 3G," IEEE Communications Magazine, vol. 39, No. 8, Aug. 2001.

Schoenwaelder, J., "Overview of the 2002 IAB Network Management Workshop," IETF Standard, Internet Engineering Task Force, May 2003.

Xue, Jianbo, et al.: "ASAP: An Adaptive QoS Protocol for Mobile Ad Hoc Networks," Personal, Indoor and Mobile Radio Communications, 2003. PIMRC 203. 14th IEEE Proceedings on Sep. 7-10, 2003, vol. 2, Sep. 7, 2003.

International Search Report and Written Opinion, dated Dec. 12, 2007, for International application No. PCT/US2007/071177, filed Jun. 14, 2007.

International Search Report and Written Opinion, dated Jan. 29, 2008, for International application No. PCT/US2007/071191, filed Jun. 14, 2007.

International Search Report and Written Opinion, dated Jan. 17, 2008, for International application No. PCT/US2007/071273, filed Jun. 14, 2007.

International Search Report and Written Opinion, dated Dec. 12, 2007, for International application No. PCT/US2007/071440, filed Jun. 18, 2007.

International Search Report and Written Opinion, dated Jan. 2, 2008, for International application No. PCT/US2007/073301, filed Jul. 12, 2007.

International Search Report and Written Opinion, dated Jan. 15, 2008, for International application No. PCT/US2007/074577, filed Jul. 27, 2007.

International Search Report and Written Opinion, dated Jan. 24, 2008, for International application No. PCT/US2007/074587, filed Jul. 27, 2007.

International Search Report and Written Opinion, dated Feb. 6, 2008, for International application No. PCT/US2007/074592, filed Jul. 27, 2007.

International Search Report and Written Opinion, dated Jan. 22, 2008, for International application No. PCT/US2007/074599, filed Jul. 27, 2007.

International Search Report and Written Opinion, dated Mar. 14, 2008, for International application No. PCT/US2007/011649, filed May 15, 2007.

Office Action, dated Apr. 2, 2008, for U.S. Appl. No. 11/416,057, filed May 2, 2006.

Office Action, dated Apr. 4, 2008, for U.S. Appl. No. 11/415,914, filed May 5, 2006.

Bakre A. V. et al: "Implementation and Performance Evaluation of Indirect TCP" IEEE Transactions on Computers, vol. 46, No. 3, Mar. 1997.

"CCSDS File Delivery Protocol (CFDP)—Part 1—Introduction and Overview" (CCSDS 720.1-G-2—Green Book, Sep. 2003).

"CCSDS File Delivery Protocol (CFDP) Part 2—Implementers Guide" (CCSDS 720.2-G-2, Green Book, Sep. 2003).

Chao, H-L, et al.: "Fair Scheduling with QoS Support in Wireless Ad Hoc Networks," IEEE Transactions on Wireless Communications, vol. 3, No. 6, Nov. 2004.

Gao et al., "Performance Evaluation of the CCSDS File Delivery Protocol—Latency and Storage Requirement", Dec. 10, 2004.

Information Sciences Institute, University of Southern California, "Internet Protocol DARPA Internet Program Protocol Specification," IETF Standard, Internet Engineering Task Force, IETF, CH, Sep. 1981.

International Preliminary Report on Patentability dated Feb. 6, 2008 for International Application No. PCT/US2007/071269 filed Jun. 14, 2007.

International Search Report and Written Opinion dated Apr. 28, 2008 for International Application No. PCT/US07/11650 filed May 15, 2007.

International Search Report and Written Opinion dated Apr. 28, 2008 for International Application No. PCT/US07/10559 filed May 1, 2007.

International Search Report and Written Opinion dated Apr. 29, 2008 for International Application No. PCT/US07/10558 filed May 15, 2007.

International Search Report and Written Opinion dated Jun. 5, 2008 for International Application No. PCT/US07/11651 filed May 15, 2007.

International Search Report and Written Opinion, dated Dec. 12, 2007, for International Application No. PCT/US2007/071177, Filed Jun. 14, 2007.

International Search Report and Written Opinion, dated Dec. 12, 2007, for International Application No. PCT/US2007/071440, filed Jun. 18, 2007.

International Search Report and Written Opinion, dated Feb. 6, 2008, for International Application No. PCT/US2007/074592, filed Jul. 27, 2007.

International Search Report and Written Opinion, dated Jan. 15, 2008 for International Application No. PCT/US2007/074577, filed Jul. 27, 2007.

International Search Report and Written Opinion, dated Jan. 17, 2008, for International Application No. PCT/US2007/071273, filed Jun. 14, 1997.

International Search Report and Written Opinion, dated Jan. 2, 2008, for International Application No. PCT/US2007/073301, filed Jul. 12, 2007.
International Search Report and Written Opinion, dated Jan. 22, 2008, for International Application No. PCT/US2007/074599, filed Jul. 27, 2007.
International Search Report and Written Opinion, dated Jan. 24, 2008, for International Application No. PCT/US2007/074587, filed Jul. 27, 2007.
International Search Report and Written Opinion, dated Mar. 14, 2008, for International Application No. PCT/US2007/011649 filed May 15, 2007.
International Search Report and Written Opinion, dated Jan. 29, 2008, for International Application No. PCT/US2007/071191. filed Jun. 14, 1997.
International Search Report and Written Opinion, dated Jan. 2, 2008 for International Application No. PCT/US2007/073301, filed Jul. 12, 2007.
Lee, et al., "Expected File-Delivery Time of Deferred NAK ARQ in CCSDS File-Delivery Protocol", Aug. 2004, IEEE Transactions on Communications, vol. 52 Issue 8. pp. 1408-1416.
Madubata, C.D.: "Prioritization of the Joint Battle Space Infosphere (JBI) Traffic and Priority with Reciprocity CAC Protocol for the JBI Network," System Theory, 2006 Proceeding of the Thirty-Eighth Southeastern Symposium on Mar. 5, 2006.
Office Action dated Apr. 23, 2008, for U.S. Appl. No. 11/416,043, filed May 2, 2006.
Office Action dated Oct. 20, 2008, for U.S. Appl. No. 11/416,043, filed May 2, 2006.
Office Action dated Dec. 22, 2008, for U.S. Appl. No. 11/425,021, filed Jun. 19, 2006.
Office Action dated Jan. 5, 2009, for U.S. Appl. No. 11/425,281, filed Jun. 20, 2006.
Office Action dated Jan. 30, 2009, for U.S. Appl. No. 11/425,289, filed Jun. 20, 2006.
Office Action dated Feb. 5, 2009, for U.S. Appl. No. 11/436,912, filed May 18, 2006.
Office Action dated May 21, 2008, for U.S. Appl. No. 11/436,912, filed May 18, 2009.
Office Action dated Oct. 16, 2008, for U.S .Appl. No. 11/436,912, filed May 18, 2006.
Office Action dated Apr. 1, 2009, for US Appl. No. 11/454,206, filed Jun. 16, 2006.
Office Action dated May 30, 2008, for US Appl. No. 11/454,206, filed Jun. 16, 2006.
Office Action dated Dec. 11, 2008, for US Appl. No. 11/454,206, filed Jun. 16, 2006.
Office Action dated May 30, 2008, for US Appl. No. 11/454,219, filed Jun. 16, 2006.
Office Action dated Dec. 15, 2008, for U.S. Appl. No. 11/454,219, filed Jun. 16, 2006.
Office Action dated Nov. 25, 2008, for U.S. Appl. No. 11/454,220, filed Jun. 16, 2006.
Office Action dated Dec. 4, 2008, for U.S. Appl. No. 11/454,662, filed Jun. 16, 2006.
Office Action dated Dec. 29, 2008, for U.S .Appl. No. 11/457,662, filed Jul. 14, 2006.
Office Action dated Nov. 13, 2008, for U.S. Appl. No. 11/461,082, filed Jul. 31, 2006.
Office Action dated Mar. 30, 2008, for U.S. Appl. No. 11/471,923, filed Jun. 21, 2006.
Office Action dated Oct. 17, 2008, for U.S. Appl. No. 11/416,057, filed May 2, 2006.
Office Action dated Feb. 9, 2009, for U.S. Appl. No. 11/416,057, filed May 2, 2006.
Office Action dated Apr. 2, 2008, for U.S.Appl. No. 11/416,057, filed May 2, 2006.
Office Action dated Apr. 2, 2009, for U.S. Appl. No. 11/415,914, filed May 5, 2006.
Office Action dated Oct. 20, 2008, for U.S. Appl. No. 11/415,914, filed May 5, 2006.
Office Action dated Apr. 2, 2008, for U.S. Appl. No. 11/415,914, filed May 5, 2006.
Office Action dated Apr. 21, 2009, for U.S. Appl. No. 11/454,220, filed Jun. 16, 2006.
Orda, A. et al.,: "Routing with Packet Duplication and Elimination in Computer Networks," IEEE Transactions on Communications, vol. 36, No. 7, Jul. 1988.
Pancha, P. et al.: "A Delay-Minimizing Service Policy with Guaranteed Bandwidth for Real-Time Traffic," Internet Article, Aug. 23, 1995.
Perkins, Charles E., et al.: "Quality of Service for Ad hoc On-Demand Distance Vector Routing draft-perkins-manet-aodvqos-01.txt," IETF Standard-Working-Draft, Internet Engineering Task Force, IETF, Ch. No. 1, Oct. 14, 2003.
Robles, Tomas et al.: "QoS Support for an All-IP System Beyond 3G," IEEE Communications Magazine, vol. 39, No. 8, Aug. 2001.
Schoenwaelder, J., "Overview of the 2002 IAB Network Management Workshop," IETF Standard, Internet Engineering Task Force, May 2003.
Tactical Data Network (TDN). USMC Concepts + Programs 2003. p. 140.
Xue, Jianbo, et al.: "ASAP: An Adaptive QoS Protocol for Mobile Ad Hoc Networks," Personal, Indoor and Mobile Radio Communications, 2003. PIMRC 203. 14th IEEE Proceedings on Sep. 7-10, 2003, vol. 2, Sep. 7, 2003.
Office Action dated Apr. 27, 2009 for U.S. Appl. No. 11/416,043.
Consultative Committee for Space Data Systems, "CCSDS File Delivery Protocol (CFDP)—Part 2—Implementers Guide," CCSDS 720.2-G-2—Green Book, Sep. 2003.
Akimeka, "LLC—Mobile Modular Command Center (M2C2) Advanced Technologies Training Program (ATTP) Final Analysis Report," 2004.
Ali et al., "Solider Network Extension (SNE) On-The-Move Satellite Communications (SATCOM) for Army Tactical Battalion-Level Network Healing and Thickening," Oct. 2007.
Applecore, "What are APIs, why use them, how to use them, and how to find out more," pp. 1-3, May 2005.
Barker, "Overcoming the Data-Scale Management Challenge in Large Dynamic Networks," Military Communications Conference, MILCOM 2005, IEEE; pp. 1-7, Oct. 2005.
Laurie, "DLL Files in Windows—What Are They?," pp. 1-2, 2004.
Lee et al., "Expected File-Delivery Time of Deferred NAK ARQ in CCSDS File-Delivery Protocol," IEEE Transactions on Communications, vol. 52, Issue 8, pp. 1408-1416, Aug. 2004.
Zheng et al., "Group-Mobility-Aware Spectrum Management for Future Digital Battlefields," Military Communications Conference, 2006, MILCOM 2006, IEEE; pp. 1-7, Oct. 2006.
Floyd et al., "Link-sharing and Resource Management Models for Packet Networks," IEEE/ACM Transactions on Networking, vol. 3, No. 4, all pages, Aug. 1995.
Chan, "Precedence Based Admission Control and Preemption in IP Networks," Military Communications Conference, 2006, MILCOM 2006, IEEE, pp. 1-7, Oct. 2006.
Advisory Action dated Jan. 12, 2010, for U.S. Appl. No. 11/454,206, filed Jun. 16, 2006.
Office Action dated Oct. 13, 2009 for U.S. Appl. No. 11/471,923, filed Jun. 21, 2006.
Office Action dated Jan. 5, 2009, for U.S. Appl. No. 11/425,281, filed Jun. 20, 2006.
Office Action dated Jun. 5, 2009, for U.S. Appl. No. 11/416,057, filed May 2, 2006.
Office Action dated Jun. 10, 2009, for U.S. Appl. No. 11/454,517, filed Jun. 16, 2006.
Office Action dated Jul. 1, 2009, for U.S. Appl. No. 11/425,281, filed Jun. 20, 2006.
Office Action dated Jul. 15, 2009, for U.S. Appl. No. 11/454,219, filed Jun. 16, 2006.
Office Action dated Oct. 5, 2009, for U.S. Appl. No. 11/496,107, filed Jul. 31, 2006.
Office Action dated Oct. 13, 2009, for U.S. Appl. No. 11/454,219, filed Jun. 16, 2006.
Office Action dated Oct. 15, 2009, for U.S. Appl. No. 11/425,281, filed Jun. 20, 2006.
Office Action dated Dec. 30, 2009, for US Appl. No. 11/416,057, filed May 2, 2006.

Office Action dated May 27, 2009, for U.S. Appl. No. 11/454,662, filed Jun. 16, 2006.
Office Action dated Sep. 18, 2009 for U.S. Appl. No. 11/454,662, filed Jun. 16, 2006.
Office Action dated May 13, 2009 for U.S. Appl. No. 11/424,635, filed Jun. 16, 2006.
Office Action dated Dec. 10, 2009 for U.S. Appl. No. 11/424,635, filed Jun. 16, 2006.
Office Action dated Oct. 13, 2009 for U.S. Appl. No. 11/416,043, filed May 2, 2006.
Office Action dated Sep. 15, 2009 for U.S. Appl. No. 11/454,220, filed Jun. 16, 2006.
Office Action dated May 1, 2009 for U.S. Appl. No. 11/461,052, filed Jul. 31, 2006.
Office Action dated Dec. 15, 2009 for US Appl. No. 11/461,052 filed Jul. 31, 2006.
Office Action dated Jun. 25, 2009 for US Appl. No. 11/461,082 filed Jul. 31, 2006.
Office Action dated Oct. 28, 2009 for US Appl. No. 11/461,082 filed Jul. 31, 2006.
Office Action dated Jun. 10, 2009 for US Appl. No. 11/425,289 filed Jun. 20, 2006.
Office Action dated Jun. 10, 2009 for U.S. Appl. No. 11/454,519, filed Jun. 16, 2006.
Office Action dated Dec. 30, 2009 for U.S. Appl. No. 11/454,519. filed Jun. 16, 2006.
Office Action dated Jul. 1, 2009 for U.S. Appl. No. 11/436,912, filed May 18, 2006.
Office Action dated Jan. 6, 2010 for U.S. Appl. No. 11/436,912, filed May 18, 2006.
Office Action dated Jul. 21, 2009 for U.S. Appl. No. 11/457,662, filed Jul. 21, 2006.
Office Action dated Dec. 30, 2009 for U.S. Appl. No. 11/457,662, filed Jul. 14, 2006.
Office Action dated Jun. 1, 2009 for U.S. Appl. No. 11/461,242, filed Jul. 31, 2006.
Office Action dated Dec. 30, 2009 for U.S. Appl. No. 11/461,242, filed Jul. 31, 2006.
Office Action dated Oct. 26, 2009 for U.S. Appl. No. 11/454,206, filed Jun. 16, 2006.
Office Action dated Jan. 5, 2010 for U.S. Appl. No. 11/454,517, filed Jun. 16, 2006.
Office Action dated Aug. 31, 2009 for U.S. Appl. No. 11/415,914, filed May 2, 2006.
Office Action dated Jun. 15, 2009 for U.S. Appl. No. 11/425,021, filed Jun. 19, 2006.
Office Action dated Mar. 16, 2010 for U.S. Appl. No. 11/454,220, filed Jun. 16, 2006.
Office Action dated Mar. 18, 2010 for U.S. Appl. No. 11/496,107, filed Jul. 31, 2006.
Office Action dated Mar. 12, 2010 for U.S. Appl. No. 11/416,057, filed May 2, 2006.
Office Action dated Mar. 15, 2010 for U.S. Appl. No. 11/454,519, filed Jun. 16, 2006.
Office Action dated Mar. 15, 2010 for U.S. Appl. No. 11/454,662, filed Jun. 16, 2006.
Office Action dated Mar. 16, 2010 for U.S. Appl. No. 11/461,242, filed Jul. 31, 2006.
Office Action dated Jan. 28, 2010 for U.S. Appl. No. 11/454,219, filed Jun. 16, 2006.
Office Action dated Mar. 31, 2010 for U.S. Appl. No. 11/454,517, filed Jun. 16, 2006.
International Preliminary Report for PCTUS200707/436 dated Oct. 10, 2008.
ISR for PCTUS200707/436 dated Nov. 9, 2007.
Written Opinion of ISR for PCTUS200707/436 dated Nov. 9, 2007.
Extended European Search Report for PCTUS2007010558 dated Apr. 12, 2009.
International Search Report for PCTUS2007011651 dated Mar. 16, 2010.
Office Action dated Apr. 20, 2010 for U.S. Appl. No. 11/425,281, filed Jun. 20, 2006.
Advisory Action dated Apr. 13, 2010 for U.S. Appl. No. 11/454,219, filed Jun. 16, 2006.
Notice of Panel Decision from Pre-Appeal Brief Review dated Jul. 7, 2010 for U.S. Appl. No. 11/454,219, filed Jun. 16, 2006.
Examiner's Answer to Appeal Brief dated Jul. 8, 2010 for U.S. Appl. No. 11/454,206, filed Jun. 16, 2006.
Notice of Panel Decision from Pre-Appeal Brief Review dated Mar. 26, 2010 for U.S. Appl. No. 11/454,206, filed Jun. 16, 2006.
Office Action dated May 20, 2010 for U.S. Appl. No. 11/454,517, filed Jun. 16, 2006.
Dong et al., "APV: A Highly Efficient Transport Protocol for Low Bit Rate Multimedia Connections," Multimedia Tools and Applications, pp. 187-216, 2005.
Communication Pursuant to Article 94(3) EPC, Application No. 07812151.4, dated Jan. 21, 2010.
Office Action dated May 6, 2010 for U.S. Appl. No. 11/425,021, filed Jun. 19, 2006.
Office Action dated Apr. 27, 2010 for U.S. Appl. No. 11/424,635, filed Jun. 16, 2006.
Advisory Action dated May 13, 2010 for U.S. Appl. No. 11/454,220, filed Jun. 16, 2006.
Information Sciences Institute, "Internet Protocol Darpa Internet Program Protocol Specification," pp. 1-46, Sep. 1981.
Communication Pursuant to Article 94(3) EPC, Application No. 07813469.9, dated Nov. 17, 2009.
Office Action dated Apr. 27, 2010 for U.S. Appl. No. 11/461,082, filed Jul. 31, 2006.
Office Action dated May 11, 2010 for U.S. Appl. No. 11/425,289, filed Jun. 20, 2006.
Communication Pursuant to Rule 62 EPC, Application No. 07777069.1, dated Mar. 16, 2010.
Notice of Panel Decision from Pre-Appeal Brief Review, dated Jun. 2, 2010 for U.S. Appl. No. 11/436,912, filed May 18, 2006.
Office Action dated Jun. 10, 2010 for U.S. Appl. No. 11/457,662, filed Jul. 14, 2006.
Office Action dated Sep. 30, 2010 for U.S. Appl. No. 11/425,281, filed Jun. 20, 2006, pp. 1-13.
Korean Office Action mailed Jul. 27, 2010, in Appl. No. Oct. 2009-7000812, pp. 3-1 to 3-3.
Office Action dated Sep. 13, 2010 for U.S. Appl. No. 11/416,057, filed May 2, 2006, pp. 1-14.
Advisory Action dated Aug. 23, 2010 for U.S. Appl. No. 11/454,517, filed Jun. 16, 2006, pp. 1-2.
Office Action dated Aug. 24, 2010 for U.S. Application No. 11/425,021, filed Jun. 19, 2006, pp. 1-19.
International Preliminary Report for PCT/US2007/071159 dated Dec. 16, 2008, pp. 1-7.
Madubata, C., "Prioritization Of The Joint Battle Space Infosphere (JBI) Traffic And Priority With Reciprocity CAC Protocol For The JBI Network," System Theory, 2006 Proceeding of the Thirty-Eighth Southeastern Symposium, USA, IEEE; pp. 477-481, Mar. 5, 2006.
ISR for PCT/US2007/071159 dated Oct. 31, 2007, pp. 1-2.
Advisory Action dated Jul. 23, 2010 for U.S. Appl. No. 11/424,635, filed Jun. 16, 2006, pp. 1-2.
Translation of Japan Office Action for Patent Application No. 2009-509667, mailed Aug. 10, 2010, pp. 1-2.
Advisory Action dated Sep. 30, 2010 for U.S. Appl. No. 11/461,082, filed Jul. 31, 2006, pp. 1-2.
Office Action dated Sep. 17, 2010 for U.S. Appl. No. 11/454,519, filed Jun. 16, 2006, pp. 1-16.
Office Action dated Sep. 14, 2010 for U.S. Appl. No. 11/461,242, filed Jul. 31, 2006, pp. 1-31.
Office Action dated Apr. 19, 2011 for U.S. Appl. No. 11/425,281, filed Jun. 20, 2006, pp. 1-32.
Office Action dated Apr. 19, 2011 for U.S. Appl. No. 11/496,107, filed Jul. 31, 2006, pp. 1-37.
PCT International Preliminary Report on Patentability for Application No. PCT/US2007/011648, dated Dec. 16, 2008, pp. 1-6.
Office Action dated Apr. 13, 2011 for U.S. Appl. No. 11/416,057, filed May 2, 2006, pp. 1-39.
Office Action dated Apr. 18, 2011 for U.S. Appl. No. 11/425,289, filed Jun. 20, 2006, pp. 1-30.

Office Action dated Mar. 3, 2011 for U.S. Appl. No. 11/454,519, filed Jun. 16, 2006, pp. 1-26.
Office Action dated Apr. 25, 2011 for U.S. Appl. No. 11/457,662, filed Jul. 14, 2006, pp. 1-36.
Office Action dated Apr. 13, 2011 for U.S. Appl. No. 11/461,242, filed Jul. 31, 2006, pp. 1-47.
Translation of Japanese Office Action, Application No. 2009-515402, mailed Jan. 4, 2011, pp. 1-4.
PCT International Search Report for International Application No. PCT/US07/11648, mailed Sep. 9, 2008, pp. 1-2.
PCT International Search Report for International Application No. PCT/US2007/071197, mailed Nov. 30, 2007, pp. 1-4.
PCT International Preliminary Report for International Application No. PCT/US2007/071197, mailed Dec. 16, 2008, pp. 1-11.
PCT Written Opinion for International Application No. PCT/US2007/071197, mailed Dec. 16, 2008, pp. 1-6.
Madubata, Prioritization Of The Joint Battle Space Infosphere (JBI) Traffice And Priority With Reciprocity CAC Protocol For The JBI Network, 2006 IEEE, pp. 477-481.
Office Action dated Jan. 20, 2011 for U.S. Appl. No. 11/461,052, filed Jul. 31, 2006, pp. 1-21.
Office Action dated Jan. 3, 2011 for U.S. Appl. No. 11/461,082, filed Jul. 31, 2006, pp. 1-15.
Translation of Office Action of Japan Patent Office, dated Nov. 2, 2010, for Patent Application No. 2009-522974, pp. 1-2.
Translation of an Office Action of JPO, dated Dec. 14, 2010, for Patent Application No. 2009-511037, pp. 1-3.
Translation of Japanese Patent Office Action, dated Jan. 4, 2011, for Patent Application No. 2009-522971, pp. 1-2.
Translation of Japanese Patent Office Action, dated Jan. 4, 2011, for Patent Application No. 2009-515400, pp. 1-2.
Translation of Japanese Patent Office Action, dated Jan. 4, 2011, for Patent Application No. 2009-515401, pp. 1-2.
Translation of Japanese Patent Office Action, dated Jan. 11, 2011, for Patent Application No. 2009-516640, pp. 1-3.
Translation of Japanese Patent Office Action, dated Jan. 11, 2011, for Patent Application No. 2009-515644, pp. 1-3.
Translation of Japanese Patent Office Action, dated Feb. 1, 2011, for Patent Application No. 2009-522973, pp. 1-3.
Translation of Japanese Patent Office Action, dated Jan. 11, 2011, for Patent Application No. 2009-516641, pp. 1-3.
Translation of Japanese Patent Office Action, dated Jan. 4, 2011, for Patent Application No. 2009-515402, pp. 1-2.
Iida, et al., "Examination of the Throughputs in Cluster for Sharing Multiple Paths System," Collected Papers of Multimedia, Distribution, Cooperation, and Mobile (DICOMO) Symposium, Symposium of the Information Processing Societies, vol. 99, No. 7, Jun. 30, 1999, pp. 231-236.
Mineno et al., "Implementation of Shared Multilink Procedures for a Cluster Network Environment," Collected Papers of Multimedia, Distribution, Cooperation, and Mobile (DICOMO) Symposium, Symposium of the Information Processing Societies, vol. 98, No. 8, Jul. 8, 1998, pp. 677-684.
Office Action dated Nov. 9, 2010 for U.S. Appl. No. 11/496,107, filed Jul. 31, 2006, pp. 1-15.
Advisory Action dated Nov. 2, 2010 for U.S. Appl. No. 11/454,219, filed Jun. 16, 2006, pp. 1-4.
Office Action dated Nov. 23, 2010 for U.S. Appl. No. 11/454,219, filed Jun. 16, 2006, pp. 1-22.
Office Action dated Dec. 6, 2010 for U.S. Appl. No. 11/454,220, filed Jun. 16, 2006, pp. 1-12.
Office Action dated Oct. 25, 2010 for U.S. App. No. 11/425,289, filed Jun. 20, 2006, pp. 1-23.
Office Action dated Nov. 18, 2010 for U.S. Appl. No. 11/457,662, filed Jul. 14, 2006, pp. 1-20.
Korean Office Action mailed Oct. 27, 2010 for Korean Application No. 2009-7001125, pp. 1-3.

* cited by examiner

METHOD AND SYSTEM FOR INBOUND CONTENT-BASED QOS

BACKGROUND OF THE INVENTION

The present invention generally relates to communications networks. More particularly, the present invention relates to systems and methods for inbound content-based Quality of Service.

Communications networks are utilized in a variety of environments. Communications networks typically include two or more nodes connected by one or more links. Generally, a communications network is used to support communication between two or more participant nodes over the links and intermediate nodes in the communications network. There may be many kinds of nodes in the network. For example, a network may include nodes such as clients, servers, workstations, switches, and/or routers. Links may be, for example, based modem connections over phone lines, wires, Ethernet links, Asynchronous Transfer Mode (ATM) circuits, satellite links, and/or fiber optic cables.

A communications network may actually be composed of one or more smaller communications networks. For example, the Internet is often described as network of interconnected computer networks. Each network may utilize a different architecture and/or topology. For example, one network may be a switched Ethernet network with a star topology and another network may be a Fiber-Distributed Data Interface (FDDI) ring.

Communications networks may carry a wide variety of data. For example, a network may carry bulk file transfers alongside data for interactive real-time conversations. The data sent on a network is often sent in packets, cells, or frames. Alternatively, data may be sent as a stream. In some instances, a stream or flow of data may actually be a sequence of packets. Networks such as the Internet provide general purpose data paths between a range of nodes and carrying a vast array of data with different requirements.

Communication over a network typically involves multiple levels of communication protocols. A protocol stack, also referred to as a networking stack or protocol suite, refers to a collection of protocols used for communication. Each protocol may be focused on a particular type of capability or form of communication. For example, one protocol may be concerned with the electrical signals needed to communicate with devices connected by a copper wire. Other protocols may address ordering and reliable transmission between two nodes separated by many intermediate nodes, for example.

Protocols in a protocol stack typically exist in a hierarchy. Often, protocols are classified into layers. One reference model for protocol layers is the Open Systems Interconnection (OSI) model. The OSI reference model includes seven layers: a physical layer, data link layer, network layer, transport layer, session layer, presentation layer, and application layer. The physical layer is the "lowest" layer, while the application layer is the "highest" layer. Two well-known transport layer protocols are the Transmission Control Protocol (TCP) and User Datagram Protocol (UDP). A well known network layer protocol is the Internet Protocol (IP).

At the transmitting node, data to be transmitted is passed down the layers of the protocol stack, from highest to lowest. Conversely, at the receiving node, the data is passed up the layers, from lowest to highest. At each layer, the data may be manipulated by the protocol handling communication at that layer. For example, a transport layer protocol may add a header to the data that allows for ordering of packets upon arrival at a destination node. Depending on the application, some layers may not be used, or even present, and data may just be passed through.

One kind of communications network is a tactical data network. A tactical data network may also be referred to as a tactical communications network. A tactical data network may be utilized by units within an organization such as a military (e.g., army, navy, and/or air force). Nodes within a tactical data network may include, for example, individual soldiers, aircraft, command units, satellites, and/or radios. A tactical data network may be used for communicating data such as voice, position telemetry, sensor data, and/or real-time video.

An example of how a tactical data network may be employed is as follows. A logistics convoy may be in-route to provide supplies for a combat unit in the field. Both the convoy and the combat unit may be providing position telemetry to a command post over satellite radio links. An unmanned aerial vehicle (UAV) may be patrolling along the road the convoy is taking and transmitting real-time video data to the command post over a satellite radio link also. At the command post, an analyst may be examining the video data while a controller is tasking the UAV to provide video for a specific section of road. The analyst may then spot an improvised explosive device (IED) that the convoy is approaching and send out an order over a direct radio link to the convoy for it to halt and alerting the convoy to the presence of the IED.

The various networks that may exist within a tactical data network may have many different architectures and characteristics. For example, a network in a command unit may include a gigabit Ethernet local area network (LAN) along with radio links to satellites and field units that operate with much lower throughput and higher latency. Field units may communicate both via satellite and via direct path radio frequency (RF). Data may be sent point-to-point, multicast, or broadcast, depending on the nature of the data and/or the specific physical characteristics of the network. A network may include radios, for example, set up to relay data. In addition, a network may include a high frequency (HF) network which allows long rang communication. A microwave network may also be used, for example. Due to the diversity of the types of links and nodes, among other reasons, tactical networks often have overly complex network addressing schemes and routing tables. In addition, some networks, such as radio-based networks, may operate using bursts. That is, rather than continuously transmitting data, they send periodic bursts of data. This is useful because the radios are broadcasting on a particular channel that must be shared by all participants, and only one radio may transmit at a time.

Tactical data networks are generally bandwidth-constrained. That is, there is typically more data to be communicated than bandwidth available at any given point in time. These constraints may be due to either the demand for bandwidth exceeding the supply, and/or the available communications technology not supplying enough bandwidth to meet the user's needs, for example. For example, between some nodes, bandwidth may be on the order of kilobits/sec. In bandwidth-constrained tactical data networks, less important data can clog the network, preventing more important data from getting through in a timely fashion, or even arriving at a receiving node at all. In addition, portions of the networks may include internal buffering to compensate for unreliable links. This may cause additional delays. Further, when the buffers get full, data may be dropped.

In many instances the bandwidth available to a network cannot be increased. For example, the bandwidth available over a satellite communications link may be fixed and cannot effectively be increased without deploying another satellite. In these situations, bandwidth must be managed rather than simply expanded to handle demand. In large systems, network bandwidth is a critical resource. It is desirable for applications to utilize bandwidth as efficiently as possible. In addition, it is desirable that applications avoid "clogging the pipe," that is, overwhelming links with data, when bandwidth is limited. When bandwidth allocation changes, applications should preferably react. Bandwidth can change dynamically due to, for example, quality of service, jamming, signal obstruction, priority reallocation, and line-of-sight. Networks can be highly volatile and available bandwidth can change dramatically and without notice.

In addition to bandwidth constraints, tactical data networks may experience high latency. For example, a network involving communication over a satellite link may incur latency on the order of half a second or more. For some communications this may not be a problem, but for others, such as real-time, interactive communication (e.g., voice communications), it is highly desirable to minimize latency as much as possible.

Another characteristic common to many tactical data networks is data loss. Data may be lost due to a variety of reasons. For example, a node with data to send may be damaged or destroyed. As another example, a destination node may temporarily drop off of the network. This may occur because, for example, the node has moved out of range, the communication's link is obstructed, and/or the node is being jammed. Data may be lost because the destination node is not able to receive it and intermediate nodes lack sufficient capacity to buffer the data until the destination node becomes available. Additionally, intermediate nodes may not buffer the data at all, instead leaving it to the sending node to determine if the data ever actually arrived at the destination.

Often, applications in a tactical data network are unaware of and/or do not account for the particular characteristics of the network. For example, an application may simply assume it has as much bandwidth available to it as it needs. As another example, an application may assume that data will not be lost in the network. Applications which do not take into consideration the specific characteristics of the underlying communications network may behave in ways that actually exacerbate problems. For example, an application may continuously send a stream of data that could just as effectively be sent less frequently in larger bundles. The continuous stream may incur much greater overhead in, for example, a broadcast radio network that effectively starves other nodes from communicating, whereas less frequent bursts would allow the shared bandwidth to be used more effectively.

Certain protocols do not work well over tactical data networks. For example, a protocol such as TCP may not function well over a radio-based tactical network because of the high loss rates and latency such a network may encounter. TCP requires several forms of handshaking and acknowledgments to occur in order to send data. High latency and loss may result in TCP hitting time outs and not being able to send much, if any, meaningful data over such a network.

Information communicated with a tactical data network often has various levels of priority with respect to other data in the network. For example, threat warning receivers in an aircraft may have higher priority than position telemetry information for troops on the ground miles away. As another example, orders from headquarters regarding engagement may have higher priority than logistical communications behind friendly lines. The priority level may depend on the particular situation of the sender and/or receiver. For example, position telemetry data may be of much higher priority when a unit is actively engaged in combat as compared to when the unit is merely following a standard patrol route. Similarly, real-time video data from an UAV may have higher priority when it is over the target area as opposed to when it is merely in-route.

There are several approaches to delivering data over a network. One approach, used by many communications networks, is a "best effort" approach. That is, data being communicated will be handled as well as the network can, given other demands, with regard to capacity, latency, reliability, ordering, and errors. Thus, the network provides no guarantees that any given piece of data will reach its destination in a timely manner, or at all. Additionally, no guarantees are made that data will arrive in the order sent or even without transmission errors changing one or more bits in the data.

Another approach is Quality of Service (QoS). QoS refers to one or more capabilities of a network to provide various forms of guarantees with regard to data that is carried. For example, a network supporting QoS may guarantee a certain amount of bandwidth to a data stream. As another example, a network may guarantee that packets between two particular nodes have some maximum latency. Such a guarantee may be useful in the case of a voice communication where the two nodes are two people having a conversation over the network. Delays in data delivery in such a case may result in irritating gaps in communication and/or dead silence, for example.

QoS may be viewed as the capability of a network to provide better service to selected network traffic. The primary goal of QoS is to provide priority including dedicated bandwidth, controlled jitter and latency (required by some real-time and interactive traffic), and improved loss characteristics. Another important goal is making sure that providing priority for one flow does not make other flows fail. That is, guarantees made for subsequent flows must not break the guarantees made to existing flows.

Current approaches to QoS often require every node in a network to support QoS, or, at the very least, for every node in the network involved in a particular communication to support QoS. For example, in current systems, in order to provide a latency guarantee between two nodes, every node carrying the traffic between those two nodes must be aware of and agree to honor, and be capable of honoring, the guarantee.

There are several approaches to providing QoS. One approach is Integrated Services, or "IntServ." IntServ provides a QoS system wherein every node in the network supports the services and those services are reserved when a connection is set up. IntServ does not scale well because of the large amount of state information that must be maintained at every node and the overhead associated with setting up such connections.

Another approach to providing QoS is Differentiated Services, or "DiffServ." DiffServ is a class of service model that enhances the best-effort services of a network such as the Internet. DiffServ differentiates traffic by user, service requirements, and other criteria. Then, DiffServ marks packets so that network nodes can provide different levels of service via priority queuing or bandwidth allocation, or by choosing dedicated routes for specific traffic flows. Typically, a node has a variety of queues for each class of service. The node then selects the next packet to send from those queues based on the class categories.

Existing QoS solutions are often network specific and each network type or architecture may require a different QoS configuration. Due to the mechanisms existing QoS solutions utilize, messages that look the same to current QoS systems may actually have different priorities based on message content. However, data consumers may require access to high-priority data without being flooded by lower-priority data. Existing QoS systems cannot provide QoS based on message content at the transport layer.

As mentioned, existing QoS solutions require at least the nodes involved in a particular communication to support QoS. However, the nodes at the "edge" of network may be adapted to provide some improvement in QoS, even if they are incapable of making total guarantees. Nodes are considered to be at the edge of the network if they are the participating nodes in a communication (i.e., the transmitting and/or receiving nodes) and/or if they are located at chokepoints in the network. A chokepoint is a section of the network where all traffic must pass to another portion. For example, a router or gateway from a LAN to a satellite link would be a choke point, since all traffic from the LAN to any nodes not on the LAN must pass through the gateway to the satellite link.

Thus, there is a need for systems and methods providing QoS in a tactical data network. There is a need for systems and methods for providing QoS on the edge of a tactical data network. Additionally, there is a need for adaptive, configurable QoS systems and methods in a tactical data network.

BRIEF SUMMARY OF THE INVENTION

Certain embodiments of the present invention provide a method for communicating inbound network data to provide QoS. The method includes receiving data over a network at a node, prioritizing the data at the node by assigning a priority to the data, and communicating the data to an application at the node based at least in part on the priority of the data. The priority of the data is based at least in part on message content.

Certain embodiments of the present invention provide a system for communicating inbound networking data to provide QoS. The system includes a data prioritization component adapted to prioritize data by assigning a priority to the data and a data communications component adapted to receive the data over a network and to communicate the data to an application based at least in part on the priority of the data. The priority of the data is based at least in part on message content.

Certain embodiments of the present invention provide a computer-readable medium. The computer-readable medium includes a set of instructions for execution on a computer. The set of instructions includes a data prioritization routine configured to prioritize data by assigning a priority to the data and a data communications routine configured to receive the data over a network and to communicate the data to an application based at least in part on the priority of the data. The priority of the data is based at least in part on message content.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Figure 1:
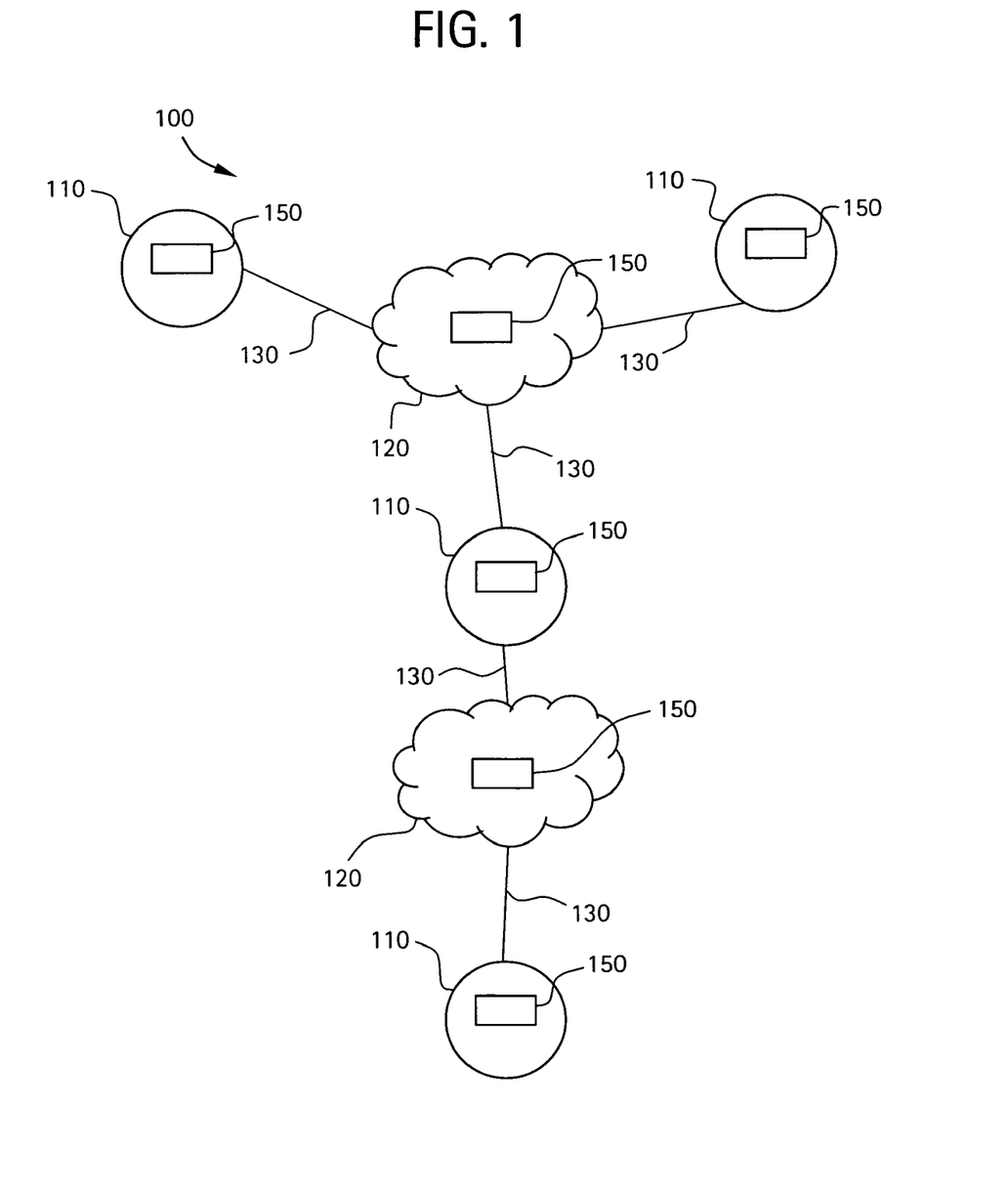
FIG. 1 illustrates a tactical communications network environment operating with an embodiment of the present invention.

FIG. 1 illustrates a tactical communications network environment 100 operating with an embodiment of the present invention. The network environment 100 includes a plurality of communication nodes 110, one or more networks 120, one or more links 130 connecting the nodes and network(s), and one or more communication systems 150 facilitating communication over the components of the network environment 100. The following discussion assumes a network environment 100 including more than one network 120 and more than one link 130, but it should be understood that other environments are possible and anticipated.

Communication nodes 110 may be and/or include radios, transmitters, satellites, receivers, workstations, servers, and/or other computing or processing devices, for example.

Network(s) 120 may be hardware and/or software for transmitting data between nodes 110, for example. Network(s) 120 may include one or more nodes 110, for example.

Link(s) 130 may be wired and/or wireless connections to allow transmissions between nodes 110 and/or network(s) 120.

The communications system 150 may include software, firmware, and/or hardware used to facilitate data transmission among the nodes 110, networks 120, and links 130, for example. As illustrated in FIG. 1, communications system 150 may be implemented with respect to the nodes 110, network(s) 120, and/or links 130. In certain embodiments, every node 110 includes a communications system 150. In certain embodiments, one or more nodes 110 include a communications system 150. In certain embodiments, one or more nodes 110 may not include a communications system 150.

Figure 2:
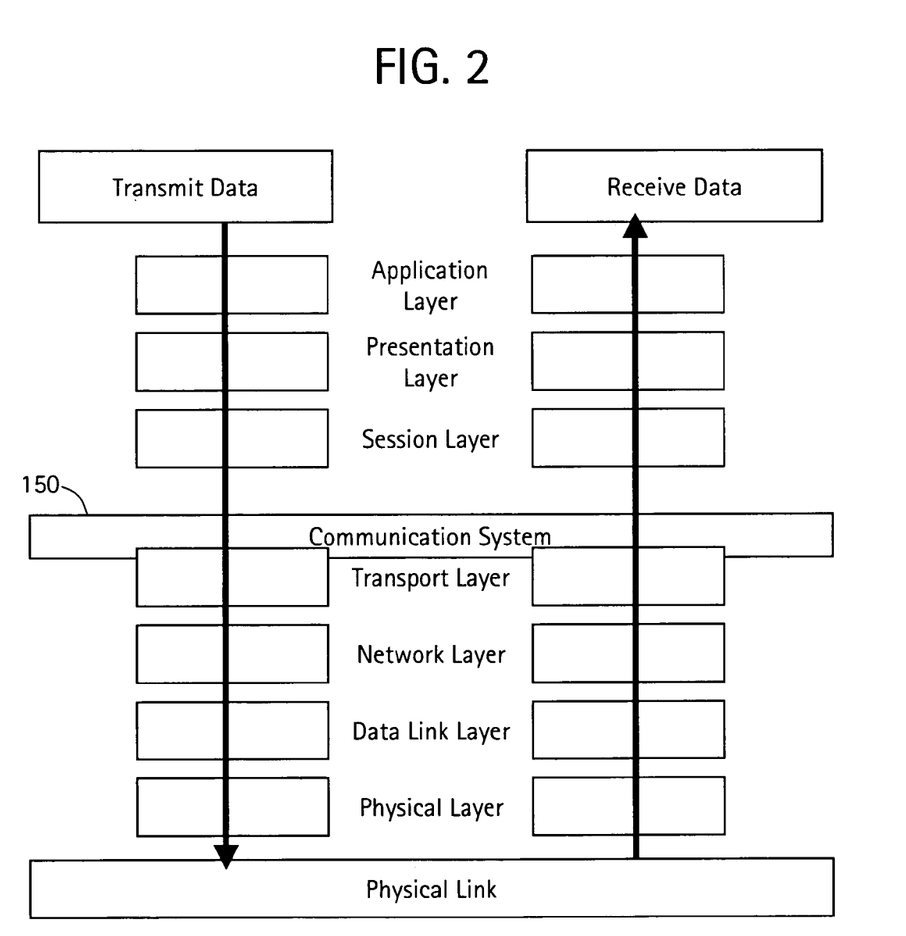
FIG. 2 shows the positioning of the data communications system in the seven layer OSI network model in accordance with an embodiment of the present invention.
Figure 3:
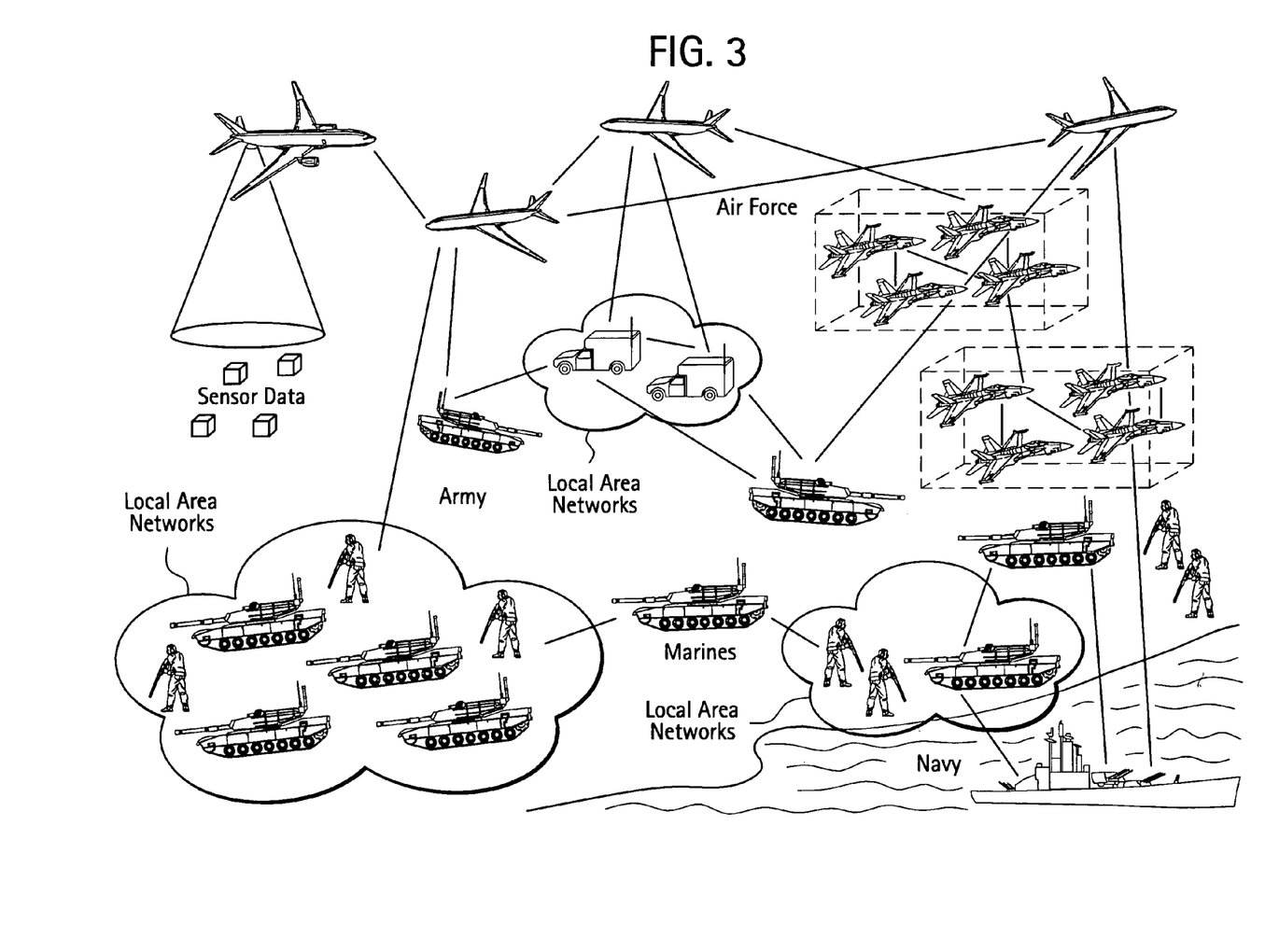
FIG. 3 depicts an example of multiple networks facilitated using the data communications system in accordance with an embodiment of the present invention.

The communication system 150 provides dynamic management of data to help assure communications on a tactical communications network, such as the network environment 100. As shown in FIG. 2, in certain embodiments, the system 150 operates as part of and/or at the top of the transport layer in the OSI seven layer protocol model. The system 150 may give precedence to higher priority data in the tactical network passed to the transport layer, for example. The system 150 may be used to facilitate communications in a single network, such as a local area network (LAN) or wide area network (WAN), or across multiple networks. An example of a multiple network system is shown in FIG. 3. The system 150 may be used to manage available bandwidth rather than add additional bandwidth to the network, for example.

In certain embodiments, the system 150 is a software system, although the system 150 may include both hardware and software components in various embodiments. The system 150 may be network hardware independent, for example. That is, the system 150 may be adapted to function on a variety of hardware and software platforms. In certain embodiments, the system 150 operates on the edge of the network rather than on nodes in the interior of the network.

However, the system 150 may operate in the interior of the network as well, such as at "choke points" in the network.

The system 150 may use rules and modes or profiles to perform throughput management functions, such as optimizing available bandwidth, setting information priority, and managing data links in the network. By "optimizing" bandwidth, it is meant that the presently described technology can be employed to increase an efficiency of bandwidth use to communicate data in one or more networks. Optimizing bandwidth usage may include removing functionally redundant messages, message stream management or sequencing, and message compression, for example. Setting information priority may include differentiating message types at a finer granularity than Internet Protocol (IP) based techniques and sequencing messages onto a data stream via a selected rule-based sequencing algorithm, for example. Data link management may include rule-based analysis of network measurements to affect changes in rules, modes, and/or data transports, for example. A mode or profile may include a set of rules related to the operational needs for a particular network state of health or condition. The system 150 provides dynamic, "on-the-fly" reconfiguration of modes, including defining and switching to new modes on the fly.

The communication system 150 may be configured to accommodate changing priorities and grades of service, for example, in a volatile, bandwidth-limited network. The system 150 may be configured to manage information for improved data flow to help increase response capabilities in the network and reduce communications latency. Additionally, the system 150 may provide interoperability via a flexible architecture that is upgradeable and scalable to improve availability, survivability, and reliability of communications. The system 150 supports a data communications architecture that may be autonomously adaptable to dynamically changing environments while using predefined and predictable system resources and bandwidth, for example.

In certain embodiments, the system 150 provides throughput management to bandwidth-constrained tactical communications networks while remaining transparent to applications using the network. The system 150 provides throughput management across multiple users and environments at reduced complexity to the network. As mentioned above, in certain embodiments, the system 150 runs on a host node in and/or at the top of layer four (the transport layer) of the OSI seven layer model and does not require specialized network hardware. The system 150 may operate transparently to the layer four interface. That is, an application may utilize a standard interface for the transport layer and be unaware of the operation of the system 150. For example, when an application opens a socket, the system 150 may filter data at this point in the protocol stack. The system 150 achieves transparency by allowing applications to use, for example, the TCP/IP socket interface that is provided by an operating system at a communication device on the network rather than an interface specific to the system 150. System 150 rules may be written in extensible markup language (XML) and/or provided via custom dynamic link libraries (DLLs), for example.

In certain embodiments, the system 150 provides quality of service (QoS) on the edge of the network. The system's QoS capability offers content-based, rule-based data prioritization on the edge of the network, for example. Prioritization may include differentiation and/or sequencing, for example. The system 150 may differentiate messages into queues based on user-configurable differentiation rules, for example. The messages are sequenced into a data stream in an order dictated by the user-configured sequencing rule (e.g., starvation, round robin, relative frequency, etc.). Using QoS on the edge, data messages that are indistinguishable by traditional QoS approaches may be differentiated based on message content, for example. Rules may be implemented in XML, for example. In certain embodiments, to accommodate capabilities beyond XML and/or to support extremely low latency requirements, the system 150 allows dynamic link libraries to be provided with custom code, for example.

Inbound and/or outbound data on the network may be customized via the system 150. Prioritization protects client applications from high-volume, low-priority data, for example. The system 150 helps to ensure that applications receive data to support a particular operational scenario or constraint.

In certain embodiments, when a host is connected to a LAN that includes a router as an interface to a bandwidth-constrained tactical network, the system may operate in a configuration known as QoS by proxy. In this configuration, packets that are bound for the local LAN bypass the system and immediately go to the LAN. The system applies QoS on the edge of the network to packets bound for the bandwidth-constrained tactical link.

In certain embodiments, the system 150 offers dynamic support for multiple operational scenarios and/or network environments via commanded profile switching. A profile may include a name or other identifier that allows the user or system to change to the named profile. A profile may also include one or more identifiers, such as a functional redundancy rule identifier, a differentiation rule identifier, an archival interface identifier, a sequencing rule identifier, a pre-transmit interface identifier, a post-transmit interface identifier, a transport identifier, and/or other identifier, for example. A functional redundancy rule identifier specifies a rule that detects functional redundancy, such as from stale data or substantially similar data, for example. A differentiation rule identifier specifies a rule that differentiates messages into queues for processing, for example. An archival interface identifier specifies an interface to an archival system, for example. A sequencing rule identifier identifies a sequencing algorithm that controls samples of queue fronts and, therefore, the sequencing of the data on the data stream. A pre-transmit interface identifier specifies the interface for pre-transmit processing, which provides for special processing such as encryption and compression, for example. A post-transmit interface identifier identifies an interface for post-transmit processing, which provides for processing such as de-encryption and decompression, for example. A transport identifier specifies a network interface for the selected transport.

A profile may also include other information, such as queue sizing information, for example. Queue sizing information identifiers a number of queues and amount of memory and secondary storage dedicated to each queue, for example.

In certain embodiments, the system 150 provides a rules-based approach for optimizing bandwidth. For example, the system 150 may employ queue selection rules to differentiate messages into message queues so that messages may be assigned a priority and an appropriate relative frequency on the data stream. The system 150 may use functional redundancy rules to manage functionally redundant messages. A message is functionally redundant if it is not different enough (as defined by the rule) from a previous message that has not yet been sent on the network, for example. That is, if a new message is provided that is not sufficiently different from an older message that has already been scheduled to be sent, but has not yet been sent, the newer message may be dropped, since the older message will carry functionally equivalent information and is further ahead in the queue. In addition, functional redundancy many include actual duplicate messages and newer messages that arrive before an older message has been sent. For example, a node may receive identical copies of a particular message due to characteristics of the underlying network, such as a message that was sent by two different paths for fault tolerance reasons. As another example, a new message may contain data that supersedes an older message that has not yet been sent. In this situation, the system 150 may drop the older message and send only the new message. The system 150 may also include priority sequencing rules to determine a priority-based message sequence of the data stream. Additionally, the system 150 may include transmission processing rules to provide pre-transmission and post-transmission special processing, such as compression and/or encryption.

In certain embodiments, the system 150 provides fault tolerance capability to help protect data integrity and reliability. For example, the system 150 may use user-defined queue selection rules to differentiate messages into queues. The queues are sized according to a user-defined configuration, for example. The configuration specifies a maximum amount of memory a queue may consume, for example. Additionally, the configuration may allow the user to specify a location and amount of secondary storage that may be used for queue overflow. After the memory in the queues is filled, messages may be queued in secondary storage. When the secondary storage is also full, the system 150 may remove the oldest message in the queue, logs an error message, and queues the newest message. If archiving is enabled for the operational mode, then the de-queued message may be archived with an indicator that the message was not sent on the network.

Memory and secondary storage for queues in the system 150 may be configured on a per-link basis for a specific application, for example. A longer time between periods of network availability may correspond to more memory and secondary storage to support network outages. The system 150 may be integrated with network modeling and simulation applications, for example, to help identify sizing to help ensure that queues are sized appropriately and time between outages is sufficient to help achieve steady-state and help avoid eventual queue overflow.

Furthermore, in certain embodiments, the system 150 offers the capability to meter inbound ("shaping") and outbound ("policing") data. Policing and shaping capabilities help address mismatches in timing in the network. Shaping helps to prevent network buffers form flooding with high-priority data queued up behind lower-priority data. Policing helps to prevent application data consumers from being overrun by low-priority data. Policing and shaping are governed by two parameters: effective link speed and link proportion. The system 150 may form a data stream that is no more than the effective link speed multiplied by the link proportion, for example. The parameters may be modified dynamically as the network changes. The system may also provide access to detected link speed to support application level decisions on data metering. Information provided by the system 150 may be combined with other network operations information to help decide what link speed is appropriate for a given network scenario.

Figure 4:
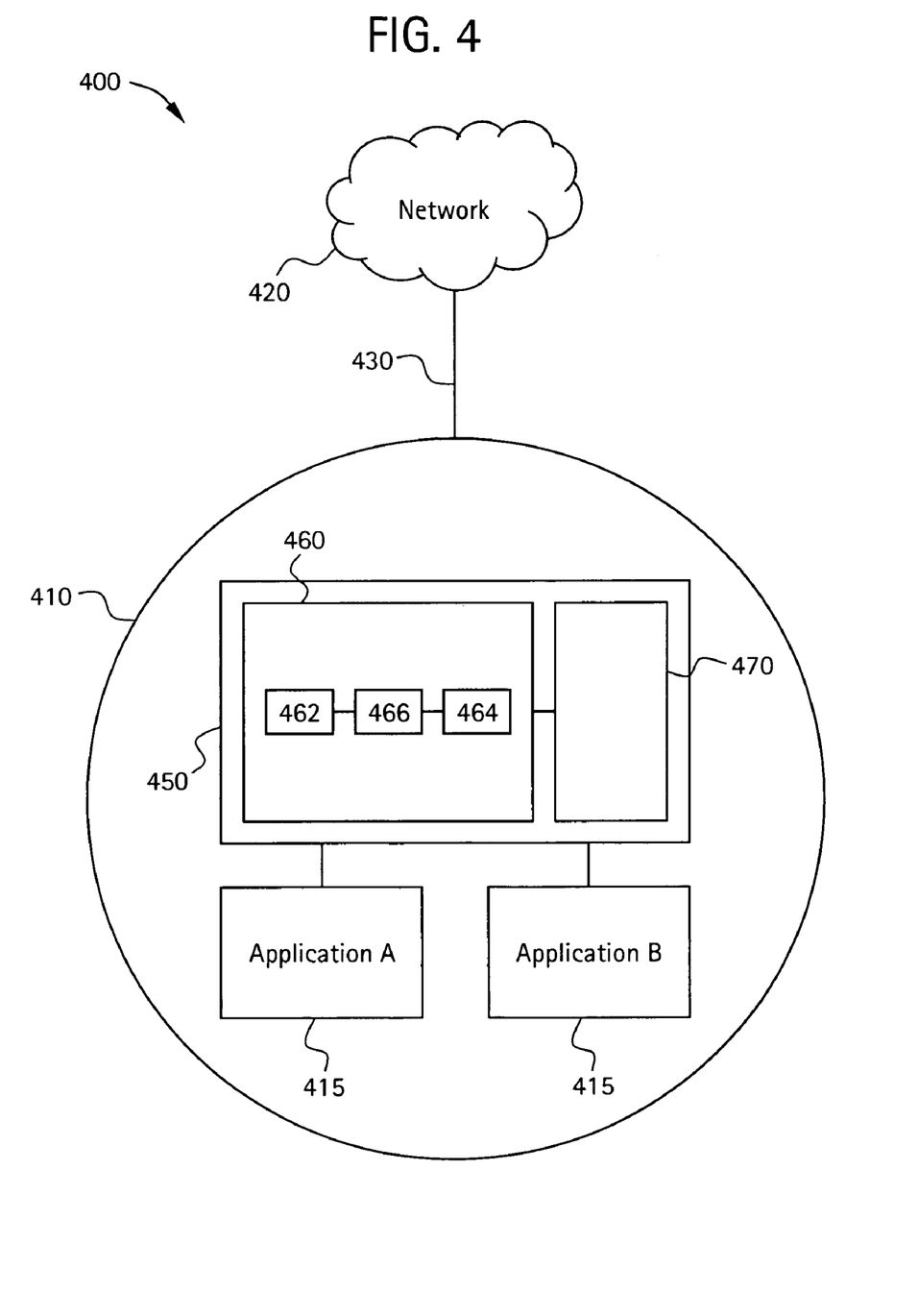
FIG. 4 illustrates a data communications environment operating according to an embodiment of the present invention.

FIG. 4 illustrates a data communications environment 400 operating according to an embodiment of the present invention. The data communications environment 400 includes one or more nodes 410, one or more networks 420, and one or more links 430 connecting the nodes 410 and the networks 420, and the data communications system 450 facilitating communications over the other components of the data communications environment 400. The data communications environment 400 may be similar to the data communications environment 100 of FIG. 1, as described above.

The data communications system 450 may operate within the node 410, as shown in FIG. 4. Alternatively, the data communications system 450 may operate within the network 420 and/or between the node 410 and the network 420. The node 410 may include one or more applications 415, such as Application A and Application B, as shown in FIG. 4.

The data communications system 450 is adapted to receive, store, organize, prioritize, process, transmit, and/or communicate data. The data received, stored, organized, prioritized, processed, transmitted, and/or communicated by the data communications system 450 may include, for example, a block of data, such as a packet, cell, frame, and/or stream.

In certain embodiments of the present invention, the data communications system 450 may include a data prioritization component 460 and a data communications component 470, which are described below in more detail.

The data prioritization component 460 prioritizes data. In certain embodiments of the present invention, the data prioritization component 460 may prioritize data based at least in part on one or more prioritization rules, such as differentiation rules and/or sequencing rules. The prioritization rules may be user defined. The prioritization rules may be written in XML and/or provided in one or more DLLs.

In certain embodiments of the present invention, the data prioritization component 460 may prioritize data based at least in part on message content. For example, the data priority may be based at least in part on data type, such as video, audio, telemetry, and/or position data. As another example, the data priority may be based at least in part on data source. For example, communications from a general may be assigned a higher priority than communications from a lower ranking officer.

In certain embodiments of the present invention, the data prioritization component 460 may prioritize data based at least in part on protocol information, such as source address and/or transport protocol. In certain embodiments of the present invention, the data prioritization component 460 prioritize data based at least in part on mode.

In certain embodiments of the present invention, the data prioritization component 460 may prioritize data by assigning a priority to the data. For example, position data and emitter data for a near threat may be associated with a priority of "HIGH," next to shoot data may be associated with a priority of "MED HIGH," top-ten shoot list data may be associated with a priority of "MED," emitter data for a threat over one hundred miles away and situational awareness (SA) data from satellite communications (SATCOM) may be associated with a priority of "MED LOW," and general status data may be assigned a priority of "LOW."

As described above, data may be assigned and/or associated with a priority. For example, the data priority may include "HIGH," "MED HIGH," "MED," "MED LOW," or "LOW." As another example, the data priority may include "KEEP PILOT ALIVE," "KILL ENEMY," or "INFORMATIONAL."

In certain embodiments of the present invention, the data priority may be based at least in part on a type, category, and/or group of data. For example, types of data may include position data, emitter data for a near threat, next to shoot data, top-ten shoot list data, emitter data for a threat over one hundred miles away, SA data from SATCOM, and/or general status data. Additionally, the data may be grouped into categories, such as "KEEP PILOT ALIVE," "KILL ENEMY," and/or "INFORMATIONAL." For example, "KEEP PILOT ALIVE" data, such as position data and emitter data for a near threat, may relate to the health and safety of a pilot. As another example, "KILL ENEMY" data, such as next to shoot data, top-ten shoot list data, and emitter data for a threat over one hundred miles away, may relate to combat systems. As another example, "INFORMATIONAL" data, such as SA data from SATCOM and general status data, may relate to non-combat systems.

As described above, the data type, category, and/or group may be the same as and/or similar to the data priority. For example, "KEEP PILOT ALIVE" data, such as position data and emitter data for a near threat, may be associated with a priority of "KEEP PILOT ALIVE," which is more important than "KILL ENEMY" data, such as next to shoot data, top-ten shoot list data, and emitter data for a threat over one hundred miles away, associated with a priority of "KILL ENEMY." As another example, "KILL ENEMY" data, such as next to shoot data, top-ten shoot list data, and emitter data for a threat over one hundred miles away, may be associated with a priority of "KILL ENEMY," which is more important than "INFORMATIONAL" data, such as SA data from SATCOM and general status data, associated with a priority of "INFORMATIONAL."

In certain embodiments of the present invention, the data prioritization component 460 may include a differentiation component 462, a sequencing component 464, and a data organization component 466, which are described below in more detail.

The differentiation component 462 differentiates data. In certain embodiments of the present invention, the differentiation component 462 may differentiate data based at least in part on one or more differentiation rules, such as queue selection rules and/or functional redundancy rules. The differentiation rules may be user defined. The differentiation rules may be written in XML and/or provided in one or more DLLs.

In certain embodiments of the present invention, the differentiation component 462 may add data to the data organization component 466. For example, the differentiation component 462 may add data to the data organization component 466 based at least in part on one or more queue selection rules.

In certain embodiments of the present invention, the differentiation component 462 may remove and/or withhold data from the data organization component 46. For example, the differentiation component 462 may remove data from the data organization component 466 based at least in part on one or more functional redundancy rules.

The sequencing component 464 sequences data. In certain embodiments of the present invention, the sequencing component 464 may sequence data based at least in part on one or more sequencing rules, such as such as starvation, round robin, and relative frequency. The sequencing rules may be user defined. The sequencing rules may be written in XML and/or provided in one or more DLLs.

In certain embodiments of the present invention, the sequencing component 464 may select and/or remove data from the data organization component 466. For example, the sequencing component 464 may remove data from the data organization component 46 based at least in part on the sequencing rules.

The data organization component 466 stores and/or organizes data. In certain embodiments of the present invention, the data organization component 466 may store and/or organize the data based at least in part on priority, such as "KEEP PILOT ALIVE," "KILL ENEMY," and "INFORMATIONAL."

In certain embodiments of the present invention, the data organization component 466 may include, for example, one or more queues, such as Q1, Q2, Q3, Q4, and Q5. For example, data associated with a priority of "HIGH" may be stored in Q1, data associated with a priority of "MED HIGH" may be stored in Q2, data associated with a priority of "MED" may be stored in Q3, data associated with a priority of "MED LOW" may be stored in Q4, and data associated with a priority of "LOW" may be stored in Q5. Alternatively, the data organization component 466 may include, for example, one or more trees, tables, linked lists, and/or other data structures for storing and/or organizing data.

The data communications component 470 communicates data. In certain embodiments of the present invention, the data communications component 470 receives data, for example, from a node 410 and/or an application 415 running on the node 410, or over a network 420 and/or a link 430 connecting the node 410 to the network 420. In certain embodiments of the present invention, the data communications component 470 transmits data, for example, to a node 410 and/or an application 415 running on the node 410, or over a network 420 and/or a link connecting the node 410 to the network 420.

In certain embodiments of the present invention, the data communications component 470 communicates with the data prioritization component 460. More particularly, the data communications component 470 transmits data to the differentiation component 462 and receives data from the sequencing component 464. Alternatively, the data communications component 470 may communicate with the data organization component 466.

In certain embodiments of the present invention, the data prioritization component 460 may perform one or more of the functions of the data communications component 470.

In certain embodiments of the present invention, the data communications component 470 may communicate data based at least in part on data priority.

In operation, for example, data is received over the network 420 by the data communications component 470. The received data is prioritized by the data prioritization component 460 based at least in part on message content and/or mode. The prioritized data is transmitted to one or more applications 415 by the data communications component 470.

In certain embodiments of the present invention, the data communication system 450 may not receive all of the data. For example, some of the data may be stored in a buffer and the data communication system 450 may receive only header information and a pointer to the buffer. As another example, the data communication system 450 may be hooked into the protocol stack of an operating system and when an application passes data to the operating system through a transport layer interface (e.g., sockets), the operating system may then provide access to the data to the data communication system 450.

In certain embodiments of the present invention, the data communications system 450 may not drop data. That is, although the data may be lower priority, it is not dropped by the data communications system 450. Rather, the data may be delayed for a period of time, potentially dependent on the amount of higher priority data that is received.

In certain embodiments of the present invention, the data communications system 450 is transparent to other applications. For example, the processing, organizing, and/or prioritization performed by the data communications system 450 may be transparent to one or more nodes 410 or other applications or data sources. As another example, an application 415 running on the same system as the data communications system 450, or on a node 410 connected to the data communications system 450, may be unaware of the prioritization of data performed by the data communications system 450.

In certain embodiments of the present invention, the data communications system 450 may provide QoS.

As discussed above, the components, elements, and/or functionality of the data communication system 450 may be implemented alone or in combination in various forms in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Figure 5:
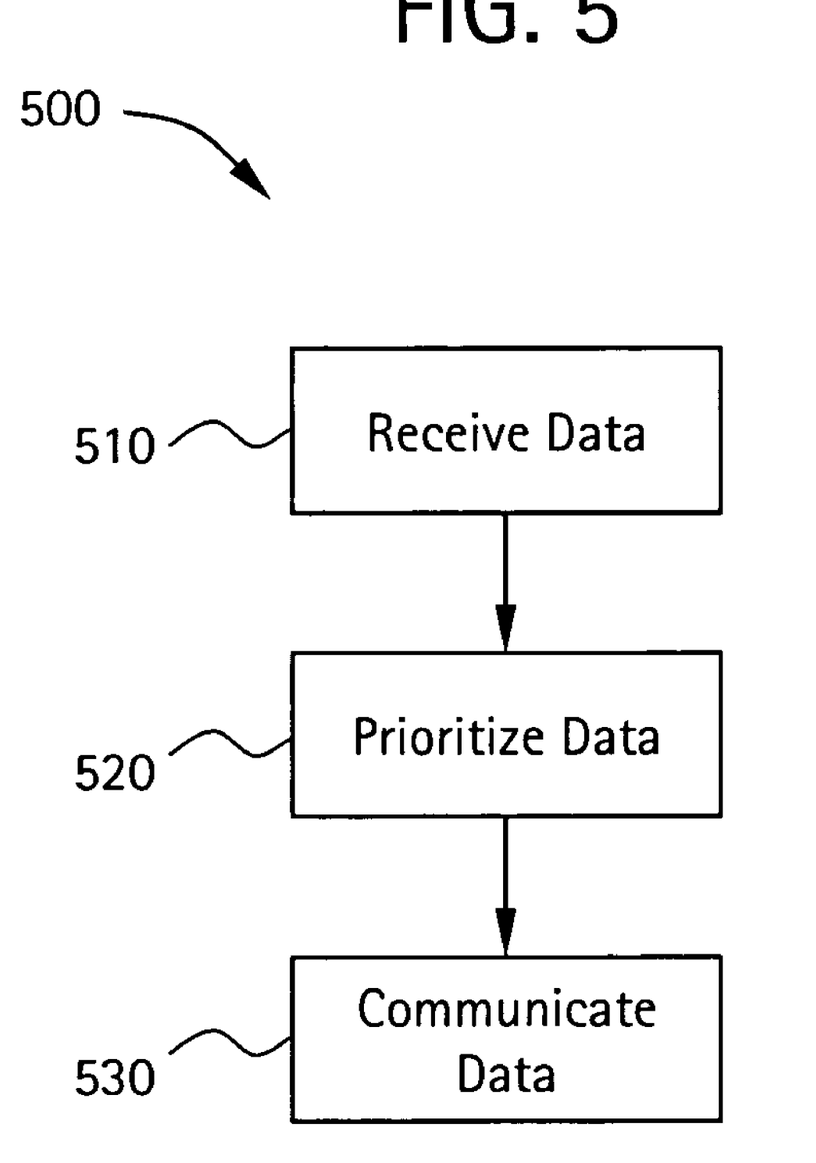
FIG. 5 illustrates a flow chart of a method for communicating data according to an embodiment of the present invention.

FIG. 5 illustrates a flow diagram of a method 500 for communicating data according to an embodiment of the present invention. The method 500 includes the following steps, which will be described below in more detail. At step 510, data is received. At step 520, the data is prioritized. At step 530, the data is communicated. The method 500 is described with reference to elements of the data communications environment 400 of FIG. 4, but it should be understood that other implementations are possible.

At step 510, the data is received. The data may be received, for example, by the data communications system 450, as described above. As another example, the data may be received from a node 410 and/or an application 415 running on the node 410. As another example, the data may be received, for example, over a network 420 and/or a link connecting the node 410 and the network 420.

In certain embodiments of the present invention, the data may be received over a network 420 at a node 410.

At step 520, the data is prioritized. The data prioritized may be the data received at step 510, for example. The data may be prioritized, for example, by the data communications system 450 of FIG. 4, as described above. As another example, the data may be prioritized by the data prioritization component 460 of the data communications system 450 based at least in part on data prioritization rules.

In certain embodiments of the present invention, the data may be prioritized based at least in part on one or more prioritization rules. In certain embodiments of the present invention, the data may be prioritized based at least in part on message content. In certain embodiments of the present invention, the priority of the data may be based at least in part on mode. In certain embodiments of the present invention, the data may be prioritized based at least in part on protocol information. In certain embodiments of the present invention, the data may be prioritized at the node 410 by assigning a priority to the data.

At step 530, the data is communicated. The data communicated may be the data received at step 510, for example. The data communicated may be the data prioritized at step 520, for example. The data may be communicated, for example, by the data communications system 450, as described above. As another example, the data may be communicated to a node 410 and/or an application 415 running on the node 410. As another example, the data may be communicated over a network 420 and/or a link connecting the node 410 and the network 420.

In certain embodiments of the present invention, the data may be communicated to an application at the node 410 based at least in part on the priority of the data. The priority of the data may be the data priority determined at step 520, for example.

One or more of the steps of the method 500 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

In one embodiment of the present invention, a method for communicating inbound network data to provide QoS includes receiving data over a network, prioritizing the data by assigning a priority to the data, and communicating the data to an application based at least in part on the priority of the data. The priority of the data is based at least in part on message content.

In one embodiment of the present invention, a system for communicating inbound networking data to provide QoS includes a data prioritization component adapted to prioritize data by assigning a priority to the data and a data communications component adapted to receive the data over a network and to communicate the data to an application based at least in part on the priority of the data. The priority of the data is based at least in part on message content.

In one embodiment of the present invention, a computer-readable medium includes a set of instructions for execution on a computer. The set of instructions includes a data prioritization routine configured to prioritize data by assigning a priority to the data and a data communications routine configured to receive the data over a network and to communicate the data to an application based at least in part on the priority of the data. The priority of the data is based at least in part on message content.

Certain embodiments of the present invention provide a method for inbound content-based QoS. The method includes receiving TCP and/or UDP addressed network data over a network, prioritizing the network data using a priority algorithm, processing the network data for redundancy, and using an extraction algorithm to forward the network data to one or more applications. The extraction algorithm may be similar to the sequencing algorithm, as described above. For example, the extraction algorithm may be based at least in part on starvation, relative frequency, or a combination of starvation and relative frequency. Starvation refers to servicing the highest priority queue, unless it is empty, and then servicing lower priority queues. Starvation may be advantageous because the highest priority data never waits for lower priority data. However, starvation may be disadvantageous because if there is enough of the highest priority data, lower priority queues will never be serviced. Relative frequency is similar to starvation, except that there is a cap on the number of times that a queue gets serviced before the next queue is to be serviced. Relative frequency may be advantageous because all of the queues are serviced However, relative frequency may be disadvantageous because the highest priority data may sometimes wait for lower priority data. A combination of starvation and relative frequency allows a user to select a subset of queues to be processed via starvation and another subset of queues to be processed via relative frequency. In certain embodiments, the extraction algorithm may be configured by a user.

Thus, certain embodiments of the present invention provide systems and methods for inbound content-based QoS. Certain embodiments provide a technical effect of inbound content-based QoS.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for communicating inbound network data to provide quality of service, the method including:
   receiving inbound data at a processor, wherein inbound data comprises data received over a network at the processor for communication to an application at the processor;
   prioritizing the inbound data at the processor by assigning a priority to the inbound data and differentiating the inbound data based at least in part on queue selection and functional redundancy, wherein differentiating the inbound data based on functional redundancy comprises processing the inbound data by removing functionally redundant inbound data, wherein the priority of the inbound data is based at least in part on message content, wherein the prioritizing the inbound data occurs at a transport layer of a network communications protocol stack; and
   communicating the inbound data to the application at the processor based at least in part on the assigned priority of the inbound data.

2. The method of claim 1, wherein the inbound data includes at least one of a cell, a frame, a packet, and a stream.

3. The method of claim 1, wherein the priority of the inbound data includes one or more of a type of data, a category of data, and a group of data.

4. The method of claim 1, wherein the receiving step includes receiving the inbound data at a node on the edge of a network.

5. The method of claim 1, wherein the priority of the inbound data is based at least in part on protocol information.

6. The method of claim 1, wherein the priority of the inbound data is based at least in part on mode.

7. The method of claim 1, wherein the inbound data is prioritized based at least in part on a user defined rule.

8. The method of claim 1, wherein the prioritizing step includes sequencing the inbound data.

9. The method of claim 8, wherein the inbound data is sequenced based at least in part on at least one of starvation, round robin, and relative frequency.

10. The method of claim 1, wherein the prioritizing step is transparent to an application program.

11. The method of claim 1, wherein the inbound data is prioritized to provide quality of service.

12. A system for communicating inbound network data to provide quality of service, the system including:
    a data prioritization component configured to prioritize inbound data by assigning a priority to the inbound data and differentiating the inbound data based at least in part on queue selection and functional redundancy, wherein differentiating the inbound data based on functional redundancy comprises processing the inbound data by removing functionally redundant inbound data, wherein inbound data comprises data received over a network at a node for communication to an application at the node, wherein the priority of the inbound data is based at least in part on message content, wherein the prioritization of the inbound data occurs at a transport layer of a network communications protocol stack; and
    a data communications component configured to receive the inbound data over the network at the node and to communicate the prioritized and processed inbound data to the application at the node based at least in part on the assigned priority of the inbound data.

13. The system of claim 12, wherein the data prioritization component includes a data organization component configured to organize the inbound data based at least in part on the priority of the inbound data.

14. The system of claim 13, wherein the data organization component includes a data structure.

15. The system of claim 14, wherein the data structure includes at least one of a queue, a tree, a table, and a list.

16. A non-transitory computer-readable storage medium encoded with a set of instructions for execution on a computer, the set of instructions including:
    a data prioritization routine configured to prioritize inbound data by assigning a priority to the data and differentiating the inbound data based at least in part on queue selection and functional redundancy, wherein differentiating the inbound data based on functional redundancy comprises processing the inbound data by removing functionally redundant inbound data, wherein inbound data comprises data received over a network at a node for communication to an application at the node, wherein the priority of the inbound data is based at least in part on message content, wherein the prioritization of the inbound data occurs at a transport layer of a network communications protocol stack; and
    a data communications routine configured to receive the inbound data over the network at the node and to communicate the prioritized and processed inbound data to an application at the node based at least in part on the assigned priority of the inbound data.

* * * * *